United States Patent
Miyamoto et al.

(10) Patent No.: US 7,238,447 B2
(45) Date of Patent: Jul. 3, 2007

(54) ENCLOSED NICKEL-ZINC PRIMARY BATTERY ITS ANODE AND PRODUCTION METHODS FOR THEM

(75) Inventors: Kunihiko Miyamoto, Tokyo (JP); Shuichiro Irie, Kanagawa (JP); Shinichi Miyamoto, Tokyo (JP); Naomi Hadano, Tokyo (JP); Teiji Okayama, Gunma (JP)

(73) Assignee: Toshiba Battery Co., Ltd., Tokyo (JP)

( * ) Notice: Subject to any disclaimer, the term of this patent is extended or adjusted under 35 U.S.C. 154(b) by 404 days.

(21) Appl. No.: 10/416,787

(22) PCT Filed: Nov. 16, 2001

(86) PCT No.: PCT/JP01/10050

§ 371 (c)(1),
(2), (4) Date: Oct. 14, 2003

(87) PCT Pub. No.: WO02/41422

PCT Pub. Date: May 23, 2002

(65) Prior Publication Data

US 2004/0072070 A1    Apr. 15, 2004

(30) Foreign Application Priority Data

| Nov. 17, 2000 | (JP) | 2000-351812 |
| Dec. 1, 2000 | (JP) | 2000-367041 |
| Mar. 8, 2001 | (JP) | 2001-064773 |
| Jun. 29, 2001 | (JP) | 2001-199752 |
| Jun. 29, 2001 | (JP) | 2001-199753 |
| Jun. 29, 2001 | (JP) | 2001-199759 |
| Jun. 29, 2001 | (JP) | 2001-199761 |
| Oct. 5, 2001 | (JP) | 2001-310323 |

(51) Int. Cl.
*H01M 4/52* (2006.01)

(52) U.S. Cl. ........................ 429/223
(58) Field of Classification Search ............ 429/60, 429/223, 229, 232
See application file for complete search history.

(56) References Cited

U.S. PATENT DOCUMENTS

| 5,506,076 A | 4/1996 | Miyamoto et al. |
| 6,265,105 B1 * | 7/2001 | Tokuda et al. ............ 429/206 |
| 6,284,410 B1 * | 9/2001 | Durkot et al. ............ 429/229 |
| 6,472,103 B1 * | 10/2002 | Durkot et al. ............ 429/229 |
| 6,740,451 B2 * | 5/2004 | Christian et al. ........... 429/223 |
| 2002/0034470 A1 * | 3/2002 | Yamamoto et al. ......... 423/592 |

FOREIGN PATENT DOCUMENTS

CN    1186356 A    7/1998

(Continued)

*Primary Examiner*—Gregg Cantelmo
(74) *Attorney, Agent, or Firm*—Oblon, Spivak, McClelland, Maier & Neustadt, P.C.

(57) ABSTRACT

A high-capacity enclosed nickel-zinc primary battery excellent in characteristics such as capacity maintenance factor, energy density, and high-efficient discharge characteristics, an anode using it, and a production method for them. An enclosed nickel-zinc primary battery which uses as an anode an anode active material of nickel hydroxide compound, such as nickel oxyhydroxide, particles and uses zinc alloy gel as a cathode material, wherein a ratio of anode theoretical capacity to cathode theoretical capacity is 1.0-1.6, and a ratio of alkali electrolyte to anode theoretical capacity is 1.0-1.6 ml/Ah.

21 Claims, 5 Drawing Sheets

FOREIGN PATENT DOCUMENTS

| | | | |
|---|---|---|---|
| EP | 1148029 A2 * | 10/2001 | |
| JP | 52034737 A * | 3/1977 | |
| JP | 60081777 A * | 5/1985 | |
| JP | 2001-15106 | 1/2001 | |
| JP | 2001-93525 | 4/2001 | |
| JP | 2000-311703 | 11/2001 | |
| JP | 2002-8650 | 1/2002 | |
| WO | WO 00/21151 | 4/2000 | |

* cited by examiner

ENCLOSED NICKEL-ZINC PRIMARY BATTERY ITS ANODE AND PRODUCTION METHODS FOR THEM

TECHNICAL FIELD

This invention relates to a enclosed nickel-zinc primary battery, anode thereof and their production methods.

BACKGROUND ART

Enclosed alkali primary batteries are used as power sources of portable type electronic devices such as portable radio sets or cassette recorders, for example.

A typical material of anodes of alkali batteries is manganese dioxide.

Recent development of various portable electronic devices is remarkable, and more and more devices need a heavy loading property. Therefore, there is a demand for a battery more excellent in high-efficiency discharge property than alkaline-manganese batteries that have been used most typically heretofore.

Conventionally known batteries include those having a spiral structure made by winding sheet-like anode, cathode and separator and injecting an electrolytic solution, and those having an inside-out structure in which a cylindrical anode, gel cathode and cylindrical separator are contained in a cylindrical metal can.

Inside-out batteries are more excellent in productivity and can provide a higher capacity at a lower cost than spiral type batteries. However, because of a small opposed area of the positive and cathodes, inside-out batteries are inferior in high-efficiency discharge property.

On the other hand, there is also known another battery excellent in high-efficiency discharge property, which is a nickel-zinc battery using a nickel oxide as the anode, zinc as the cathode and alkali salt solution as the electrolytic solution (U.K. Patent 365125).

In addition to that, this battery has a lot of advantages including (1) a high battery voltage, (2) flatness of the discharge curve and (3) high utility factor under high-rate discharge.

That battery, however, has not yet been brought into practical use.

A reason thereof is that the problems of a short lifetime caused by generation of dendrite of zinc pole in charge-discharge cycles and changes in shape have not been solved sufficiently.

There is also known an inside-out type nickel-zinc secondary battery using nickel hydroxide as the anode active material and zinc as the cathode active material (Japanese Patent Laid-Open Publication 2000-67910).

This battery, however, involves the problem that oxygen gas is generated from the anode while the charge-discharge cycle is repeated, the internal pressure of the battery rises, and the electrolytic solution may leak.

Furthermore, the theoretical capacity ratio of the positive and cathodes of this battery is 1:2. This is a remedy for preventing deterioration of the battery characteristics, such as preventing generation of a gas, and it results in leaving a large quantity of the cathode active material not used for the discharge and making it difficult to accomplish a high capacitance.

Regarding nickel-zinc primary batteries, there are almost no reports on their development.

It is therefore the first object of the invention to provide a enclosed nickel-zinc primary battery maintaining the excellent characteristics of the conventional nickel-zinc battery, having a high capacity and excellent in ratio of maintaining the capacity during its storage.

The second object of the invention is to provide an inside-out type nickel-zinc primary battery excellent in high-efficiency discharge property.

The third object of the invention is to provide a enclosed nickel-zinc primary battery having a high energy density per unit weight.

The fourth object of the invention is to provide a method of production the enclosed nickel-zinc primary battery.

The fifth object of the invention is to provide a anode used in the enclosed nickel-zinc primary battery and its production method.

DISCLOSURE OF INVENTION

The invention provides different versions of enclosed nickel-zinc primary batteries, anodes used therein, and production methods of those batteries and their anodes.

Enclosed nickel-zinc primary batteries according to the invention uses a specific nickel hydroxide as its anode active material to form a structure suitable for primary batteries, and thereby ensures the aforementioned excellent characteristics.

The feature can be obtained by (1) optimizing the negative/anode theoretical capacity ratio, (2) optimizing the ratio of the electrolytic solution relative to the anode theoretical capacity, and (3) determining the optimum range of electric conductivity of the alkali electrolytic solution.

For realizing the enclosed nickel-zinc primary battery according to the invention, it is important to improve the discharge capacity. For this purpose, those characteristics can be remarkably improved by (4) shaping the anode active material into balls.

To additionally improve the self-discharge of the battery, the effects are further improved by (5) forming a high-order oxide layer of cobalt on the surface of the anode active material and/or by (6) using NaOH and LiOH as additives to the alkali electrolytic solution.

Furthermore, the battery according to the invention is characterized in being excellent in productivity when having an inside-out structure.

That is, according to the first aspect of the invention, there is provided a enclosed nickel-zinc primary battery using nickel compound grains as the major anode active material thereof, characterized in that the ratio of the anode theoretical capacity relative to the cathode theoretical capacity is in the range from 1.0 to 1.6 and the ratio of the alkali electrolytic solution relative to the anode theoretical capacity is in the range from 1.0 to 1.6 ml/Ah.

In the present invention, the term "using nickel compound grains as the anode active material" describes that all or most of the component of the anode active material of the battery is made up of nickel compound grains, and it means that other known anode active material such as $MnO_2$ may be mixed in the anode active material of nickel compound grains.

In the first aspect of the invention, the battery is preferably made up of a anode compact molded under a pressure from a anode mixture containing the nickel compound grains as the anode active material, a gel cathode in which alloy powder containing zinc as its major component is dispersed in an alkali electrolyte solution, and a separator which all are contained in a metal can, and the ratio in volume of the non-solid portion of the anode compact relative to the anode active material is preferably in the range from 0.2:1 through 0.5:1, and the volume ratio of the non-solid portion relative to the anode compact is preferably in the range of 15 to 30 volume %.

If the enclosed nickel-zinc primary battery has an inside-out structure, a enclosed primary battery having a good efficiency-to-capacity can be realized.

The anode active material is preferably nickel oxyhydroxide grains, and more preferably, nickel oxyhydroxide grains contain γ-nickel oxyhydroxide.

As the anode active material, nickel oxyhydroxide grains and nickel oxyhydroxide grains containing zinc and cobalt alone or both in a eutectic form are adequate materials, and the anode active material may additionally contain a compound of at least one kind of metal selected from the group consisting of yttrium, ytterbium, erbium and calcium.

The anode active material is preferably nickel oxyhydroxide grains coated by a cobalt high-order oxide, metallic cobalt or metallic nickel, or nickel oxyhydroxide grains containing zinc and cobalt alone or both of them in a eutectic form. The cobalt high-order oxide coating the anode active material is at least one material selected from the group consisting of cobalt oxyhydroxide, tri-cobalt tetroxide, bi-cobalt trioxide, cobalt monoxide, and cobalt hydroxide.

The anode active material is preferably composed of nickel oxyhydroxide grains coated by a cobalt high-order oxide, and the grains preferably exhibit an endothermic peak in the range from 200 to 260° C. in differential thermal analysis. The nickel compound grains forming the anode active material coated preferably has a specific resistance not higher than 100 Ω×cm. The anode active material is preferably nickel oxyhydroxide compound grains composed of ball-shaped grains, substantially ball-shaped grains or an aggregation of both.

The anode mixture preferably contains a quantity of carbon grains in the range from 3 to 15 mass % thereof, or more preferably in the range from 3 to 10 mass %.

Only carbon grains having a specific surface area in the range from 1.0 to 300 m$^2$/g can be selected.

The carbon grains are preferably of a mixed system of at least two groups of carbon grains different in specific surface area. The carbon grains are more preferably of a mixed system of 25 through 75 mass % of carbon grains having a specific surface area in the range from 1.0 to 30 m$^2$/g and 75 to 25 mass % of carbon grains having a specific surface area in the range from 30 to 300 m$^2$/g.

The anode mixture containing the nickel compound grains as the anode active material and carbon grains as major components thereof preferably contains a stearic acid compound. The stearic acid compound is preferably mixed in the anode mixture by a ratio in the range from 0.05 to 0.5 mass %.

The alkali electrolytic solution used in the enclosed nickel-zinc primary battery according to the invention is preferably composed of at least one selected from the group consisting of potassium hydroxide, sodium hydroxide and lithium hydroxide as a solute thereof, and the solute preferably has an electrical conductivity not lower than 0.2 S/cm.

In the first aspect of the invention, an inside-out battery can be composed by accommodating in a battery container a hollow, cylindrical anode mold prepared by compression molding of a mixture for the anode mixture containing the nickel compound grains composed of ball-shaped grains, substantially ball-shaped grains or an aggregation of both as the anode active material, the separator disposed in a hollow portion of the hollow, cylindrical anode mold, and the gel cathode including the alkali electrolytic solution and inserted in the separator.

According to the second aspect of the invention, there is provided a production method of a enclosed nickel-zinc primary battery characterized in: using nickel compound grains composed of ball-shaped grains, substantially ball-shaped grains or an aggregation of both as a anode active material; granulating a anode mixture prepared by mixing at least carbon grains to the anode active material into a granular form; thereafter molding it by compression molding and thereby preparing a hollow, cylindrical anode mold; inserting the hollow, cylindrical anode mold in a metal can; placing a separator inside a hollow cylindrical portion of the anode mold; inserting a cathode collector in a gel cathode, and sealing an opening of the can with a can seal plate.

The production method of the enclosed nickel-zinc primary battery preferably includes a step of granulating a mixture for the anode mixture containing a nickel compound as the anode active material and the carbon grains as major components thereof into a granular form, and a step of adding a stearic acid compound to the anode mixture in the granular form.

In the production method of the enclosed nickel-zinc primary battery, high-temperature aging is preferably carried out after the battery is assembled. The high-temperature aging is more preferably carried out for 24 through 72 hours at a temperature in the range from 40 to 80° C.

In the production method of the enclosed nickel-zinc primary battery, the nickel compound is preferably stored before assemblage of the battery at a temperature not higher than 30° C.

According to the third aspect of the invention, there is provided a battery-use compressed nickel compound anode prepared by compression molding of a mixture for a anode mixture containing nickel compound grains as a anode active material, the nickel compound particles being ball-shaped grains, substantially ball-shaped grains or an aggregation of both. The nickel compound grains preferably have a mean grain size in the range from 1 to 50 μm.

According to the fourth aspect of the invention, there is provided a production method of a battery-use compressed nickel compound anode comprising: a step of precipitating nickel hydroxide compound grains while mixing and stirring an inorganic nickel salt aqueous solution and an alkali aqueous solution; a step of coating surfaces of the nickel hydroxide compound grains with a cobalt compound; a step of oxidizing the nickel hydroxide compound grains coated by the cobalt compound and thereby transforming same to nickel oxyhydroxide compound grains coated by a cobalt compound; a step of adding a anode mixture additive to the nickel oxyhydroxide compound grains coated by the cobalt compound and granulating a mixture for a anode mixture produced thereby; and a step of molding the granulated anode mixture into a anode mold.

In a more preferable production method of a battery-use compressed nickel compound anode, the step of adding a anode mixture additive to the nickel oxyhydroxide compound grains coated by the cobalt compound and granulating a mixture for a anode mixture produced thereby includes a roller compaction processing step for preparing compressed powder by introducing the mixture for the anode mixture between double rolls; a granulation processing step for granulation by introducing the compressed powder between double rolls having mating projections on roll surfaces thereof; and a sorting processing step for sorting the granulated powder of a desired grain size range by using a sieve.

In this method, the double rolls preferably apply a stress per unit length in the range from $1.5 \times 10^4$ to $3.5 \times 10^4$ N/cm to the mixture for the anode mixture in the roller compaction processing step for preparing the compressed powder by introducing the mixture for the anode mixture between the double rolls. The grain size range in the sorting processing step is preferably the range from 200 to 800 μm. Furthermore, the step of preparing the anode mold preferably prepares the anode mold by compression molding of sorted grains for the anode mixture to a anode molding density in the range from 2.7 to 3.5 g/cm$^3$.

BEST MODE FOR CARRYING OUT THE INVENTION

[Structure of a Enclosed Nickel-zinc Primary Battery]

Figure 1:
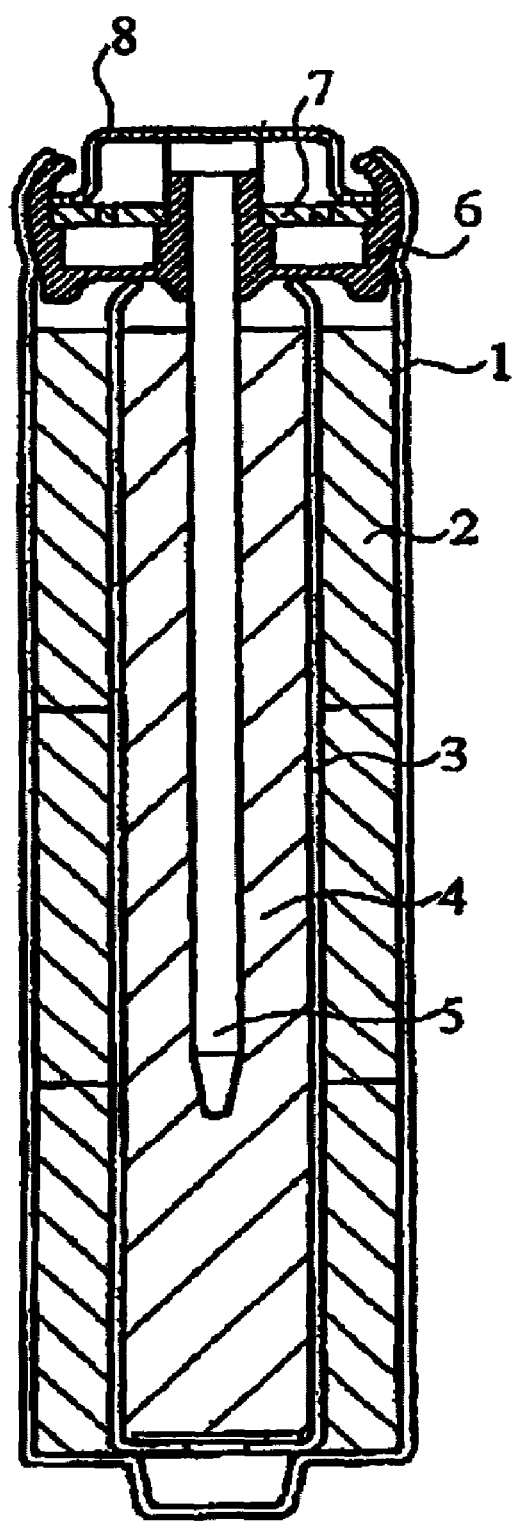
FIG. 1 is a cross-sectional view of an inside-out type battery using the invention.

FIG. 1 shows an example of application of the present invention to a battery of the LR6 type (size AA) according to the JIS standard, which has the so-called inside-out structure (the structure in which the can body of the battery functions as the anode and the cover of the battery functions as the anode).

In FIG. 1, reference numeral 1 denotes a metal can having a bottom-closed cylindrical form, which also functions as the anode. Inside the metal can 1, a anode mixture 2 containing a anode active material mainly made up of ball-shaped grains of a nickel compound and shaped into a hollow cylinder is received in contact with the inner surface of the metal can 1.

A gel zinc cathode material 4 is filled in the hollow cavity of the anode mixture 2 via a separator 3 made of nonwoven fabric, for example, into a bottom-closed cylinder.

A cathode collector rod 5 in form of a metal rod is inserted in the cathode material 4, and one end of the negative collector rod 5 projecting above the surface of the cathode material 4 is electrically connected to a ring-shaped metal plate 7 and a metal plug plate 8 functioning as the cathode terminal as well.

An insulating gasket 6 of a plastic resin such as polyamide resin, for example, in form of double rings is spread over the inner surface of the metal can 1 as the anode and the exposed outer circumferential surface of the cathode collector rod 5 to insulate them from each other.

The open end of he metal can 1 is caulked and sealed liquid-tightly.

[Design Technique of the Enclosed Nickel-zinc Primary Battery]

Explained below is a battery design technique necessary for realizing the above-explained enclosed nickel-zinc primary battery.

(1) Determination of the Ratio of the Cathode Theoretical Capacity Relative to the Anode Theoretical Capacity By establishing capacitive ratios that are value of division of various cathode theoretical capacities by the anode theoretical capacity (hereinafter simply called capacitive ratios), batteries with anodes regulated in capacity can be designed.

To design a nickel-zinc battery as a secondary battery, a capacitive ratio of 2 through 3 is necessary. Therefore, for containment in a can body of a predetermined volume, the battery capacity can be calculated to be 1500 mAh through 1900 mAh from the positive and cathode theoretical capacities.

On the other hand, in the present invention designing it as a primary battery, since the capacitive ratio can be set as slightly low as 1.0 through 1.6, the capacity can be increased by as much as approximately 70% in maximum as compared with the design of the secondary battery.

A main reason why the capacitive ratio of 1.6 is regarded as the maximum value in this proposal lies in that the discharge band of nickel oxyhydroxide of the anode is not always 1.0-valent, but a discharge band approximately 1.5-valent from γ-nickel oxyhydroxide to α-nickel hydroxide can be used under certain conditions.

That is, capacitive ratios exceeding 1.6 are not necessary as designs of primary batteries.

(2) Relationship Between the Ratio of the Electrolytic Solution Relative to the Anode Theoretical Capacity and the Utilization Factor of the Anode In general, battery design is carried out by using one of the anode and the cathode as the capacity regulating pole.

Alkali batteries, either primary or secondary, are usually designed by using their anodes as the capacity regulating poles to set the anode theoretical capacities slightly lower than the cathode theoretical capacities.

Thus the optimum amount of use of the electrolytic solution can be determined by using its ratio relative to the anode theoretical capacity.

For this purpose, fixing the anode theoretical capacity and changing the ratio of the electrolytic solution, an optimum ratio of the electrolytic solution for an experiment is determined.

(3) Relationship Between Composition of the Electrolytic Solution and its Electric Conductivity and Between the Utilization Factor of the Anode and its Capacity Maintenance Ratio Also regarding the electric conductivity of the electrolytic solution, since its relationship with the anode theoretic capacity is similarly fundamental, a review is made about the relationship of these battery characteristic factors with the anode theoretic capacity.

Through those procedures, an optimum battery for the purpose of the present invention can be designed and manufactured.

Remarking that the volume of the part of the non-solid portion in the anode mixture, containing the electrolytic solution impregnated therein, largely affects the battery characteristics, by setting the ratio in volume between the non-solid portion and the anode active material in the anode mixture and the volume ratio of the non-solid portion in the anode mixture (volume ratio of the non-solid portion relative to the anode mixture) within respective specific ranges, a battery of a high-capacity model especially excellent in high-efficiency discharge characteristics will be obtained. This battery will be explained below.

That is, when the volume of the non-solid portion in the anode mixture is defined as shown by Equation (1), the battery is mainly characterized in that the ratio between the volume of the non-solid portion in the anode mixture and the volume of the anode active material is set to 0.2:1 through 0.5:1 and the volume ratio of the non-solid in the anode mixture is set in the range from 15 to 30 volume %.

(Volume of non-solid portion) =      Equation (1)

(Volume of anode mixture filled) −

{(Volume of anode active material) + (Volume of solids other than anode active material)}

In Equation (1), the volume of the non-solid portion includes, for example, in addition to voids in the anode mixture, an electrolytic solution added upon formation and filling, gelled water-soluble binder, etc., and the volume of solids other than the anode active material includes an electrically conductive material such as, for example, carbon grains.

As explained above, the battery of that embodiment according to the invention is characterized in that the ratio between the volume of the non-solid portion in the anode mixture and the volume of the anode active material is regulated in the range from 0.2:1 through 0.5:1. If the ratio between the volume occupied by the non-solid portion and the volume occupied by the anode active material in the anode is smaller than that range, then the moisture in the electrolytic solution necessary for discharge reaction of nickel oxyhydroxide as the anode active material, which is expressed by Equation (2) below, will become scarce locally on the surface of the positive ole active material grains, and it will prevent reaction of the battery and deteriorate the high-efficiency discharge characteristics.

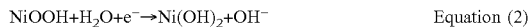

$NiOOH+H_2O+e^- \rightarrow Ni(OH)_2+OH^-$      Equation (2)

On the other hand, if the ratio between the volume occupied by the non-solid portion and the volume occupied by the anode active material in the anode is larger than that range, then the contact points between solid grains will decrease, and it will lower the electrical conductivity of the entire anode and decrease the high-efficiency discharge characteristics.

Therefore, the ratio between the volume occupied by the non-solid portion and the volume occupied by the anode active material in the anode is smaller than that range is preferably in the range from 0.2:1 through 0.5:1, more preferably in the range from 0.25:1 through 0.4:1 and further preferably in the range from 0.28:1 through 0.34:1.

Furthermore, the battery of the same embodiment according to the invention is characterized in that the volume ratio the non-solid portion occupies in the anode mixture is in the range from 15 to 30 volume %. If the volume ratio of the non-solid portion is smaller than the range, then it will be liable to suffer from breakage or cracking in the anode filled in the metal can, which will damage the charge collecting property of the entire anode and will deteriorate the discharge capacity.

On the other hand, if the volume ratio the non-solid portion occupies is larger than that range, then the physical strength of the anode will weaken, which will result in serious droppage of the active material in the subsequent production process and a decrease of the discharge capacity.

Therefore, in the present invention, the volume ratio the non-solid portion occupies is preferably in the range from 15 to 30 volume %, more preferably in the range from 18 to 27 volume % and further preferably in the range from 20 to 24 volume %.

Also in the battery of this embodiment, electric conductivity can be improved by mixing carbon grains in the anode mixture. Quantity of the carbon grains, however, is preferably limited to or below 10% in mass ratio in the anode mixture.

In the battery of this embodiment, if the quantity of the carbon grains in the anode mixture is too much, then the mass of the anode active material itself, which can be contained in the limited volume of the metal can will decrease, and carbon ions generated by oxidation of the carbon grains will accelerate the self-discharge and will decrease the discharge capacity.

Therefore, carbon grains in the anode mixture are preferably limited to or below 10 mass %, and more preferably to or below 7 mass %.

Taking the enclosed nickel-zinc primary batter designed as explained above according to the invention, materials of the anode, materials of he cathode, electrolytic solutions and methods of production the battery will be sequentially explained below in detail.

[Materials of the Anode]

(Anode Active Materials)

The anode active material used in the present invention is mainly made up of grains of a nickel compound, which is preferably a nickel hydroxide compound such as nickel hydroxide, nickel oxyhydroxide, or the like.

Nickel oxyhydroxide, among these materials, is advantageous in that as its concentration becomes higher, the battery voltage will become higher and the discharge capacity will increase.

Alternatively, a nickel hydroxide compound that contains zinc or cobalt alone, or both, in a eutectic form, especially eutectic nickel oxyhydroxide, is preferable because its structural change can be minimized even under a low electrolytic solution ratio and stable discharge is ensured.

Quantity of zinc or cobalt that is mixed in nickel oxyhydroxide or other nickel hydroxide compound is preferably adjusted in the range from 1 to 12%, or more preferably, in the range from 4 to 7%.

If the quantity of zinc is below 1%, the utilization factor will decrease, and under certain conditions, swelling of the anode will change the shape of the battery. If it is below 12%, then nickel purity will relatively decrease, and a resultant decrease of the specific gravity will decrease the capacity density unacceptably for a high-capacity model.

The surface of the nickel hydroxide compound grains, including those eutectic grains, is desirably coated by at least one material selected from the group consisting of cobalt oxyhydroxide, dicobalt tetroxide, dicobalt trioxide, cobalt oxide, cobalt hydroxide, metallic nickel and metallic cobalt because surface coating by such a material with a high electrical conductivity will increase the electrical conductivity of the entire anode and will improve the discharge capacity and the high-efficiency discharge property.

Quantity of the coating layer is desirably adjusted in the range from 2.0 to 6.0 mass % relative to the anode active material.

If the quantity of the coating layer exceeds that range, the high-cost problem will arise. If it is below that range, the problem of deterioration of the collecting performance will arise.

The use of a complex oxyhydroxide, to which a cobalt high-order compound with a high conductivity is deposited, is especially preferable from the viewpoint of ensuring electronic conductivity among nickel oxyhydroxide grains.

As the starting material of the cobalt compound deposited on that surface, cobalt hydroxide ($Co(OC)_2$), cobalt oxide (CoO) bi-cobalt trioxide ($Co_2O_3$) are usable among others, and it is oxidized into a highly-conductive high-order cobalt oxide such as cobalt oxyhydroxide (CoOOH), tri-cobalt tetroxide ($Co_3O_4$).

(Production Method of the Anode Active Material)

The above-reviewed anode material according to the invention can be manufactured by, for example, the following method.

Cobalt hydroxide is added to nickel hydroxide grains doped with zinc and cobalt, and a aqueous solution of sodium hydroxide is sprayed to the mixture while being stirred.

Subsequently, the mixture is heated by microwaves to form a layer of cobalt high-order oxide on surfaces of the nickel hydroxide grains, thereby to obtain complex nickel hydroxide grains excellent in conductivity.

It is possible to further promote oxidation by adding an oxidizing agent such as sodium hypochlorite to that reaction system, thereby to obtain complex nickel oxyhydroxide grains coated with complete cobalt high-order oxide layers and obtain a anode active material remarkably excellent in conductivity.

Alternatively, it is also possible to coat the surfaces of nickel hydroxide grains with cobalt or cobalt compound grains and obtain complex nickel hydroxide by mixing cobalt grains or cobalt compound grains, binding agent like CMC and water to grains mainly made of nickel hydroxide.

For cobalt grains or cobalt compound grains used for this purpose, cobalt hydroxide having a specific surface area in the range from 2.5 to 30 $m^3/g$ is preferably used.

When those of this range are used as cobalt grains or cobalt compound grains, sufficient contact areas are ensured between nickel hydroxide and cobalt hydroxide, and this leads to an improvement of the utilization factor of the anode.

The manufacture of such anode mixtures is explained in Japanese Patent Laid-Open Publications Nos. hei 10-233229, 10-275620 and 10-188969, and these production methods of anode mixtures may be employed in the present invention as well.

The nickel oxyhydroxide grains coating the surfaces of high-order cobalt oxide preferably exhibit the endothermic peak in the range from 200 to 260° C. in differential thermal analysis, and the specific resistance of the coat grains is most preferably 100 Ω×cm or less.

The nickel oxyhydroxide grains preferably contain γ-nickel oxyhydroxide.

More specifically, as a result of a review about the structure or configuration of the anode mainly made of the nickel oxyhydroxide grains and the electrode or battery characteristics, it has been confirmed that nickel oxyhydroxide grains coated by a high-order cobalt compound exhibit an especially excellent discharge capacity when the endothermic peak falls in the range from 200 to 260° C. in differential thermal analysis (DTA).

That is, when the endothermic peak exceeds 260° C. or below 200° C., the discharge capacity is slightly small, and the high activity is slightly lost; however, when the endothermic peak is in the range from 200 to 260° C., the most excellent high-efficiency discharge property is obtained.

Nickel oxyhydroxide grains coated by a high-order cobalt compound and having the endothermic peak in the range from 200 to 260° C. in differential thermal analysis exhibit an excellent high-efficiency discharge property when their specific resistance is a value not higher than 1000 Ω×cm, preferably not higher than 300 Ω×cm.

It is presumed that, when the specific resistance exceeds 100 Ω×cm, the high-order cobalt compound coating the surfaces contain a large quantity of substances such as $Co_3O_4$, which are somewhat inactive electrochemically.

Nickel oxyhydroxide grains coated by a high-order cobalt compound and having the endothermic peak in the range from 200 to 260° C. in differential thermal analysis are, in general, preferably made of materials of β-oxyhydroxide nickel and γ-oxyhydroxide nickel systems.

γ-nickel oxyhydroxide has a higher valence than β-nickel oxyhydroxide and a higher oxygen overvoltage. However, it tends to invite a decrease of the apparent density, and the packing quantity of the active material becomes insufficient for obtaining a sufficient battery capacity.

β-nickel oxyhydroxide has a low oxygen overvoltage and involves the problem of capacity deterioration by self-discharge; however, the problem of the self-discharge is improved by coexistence with γ-oxyhydroxide nickel.

In the anode active material according to this embodiment, nickel oxyhydroxide grains may be simple nickel oxyhydroxide, or may contain at least one of zinc and cobalt.

The nickel oxyhydroxide grains coated by the high-order cobalt oxide can be obtained by chemical oxidation carried out by, for example, immersing nickel hydroxide grains coated by a high-order cobalt compound into a aqueous solution of an oxidizing agent such as hydrogen peroxide or hypochlorite while stirring the solution.

A more bodily method of fabricating the anode active material according to that embodiment will be explained below.

First prepared is mixed powder of powder (grains) containing nickel hydroxide as its major component, and powder of at least one of metallic cobalt, cobalt hydroxide, tri-cobalt tetroxide ($Co_3O_4$) and cobalt oxide (CoO).

Composition ratio of cobalt and cobalt compounds is typically about 0.5 to 20 mass % to ensure a conductivity and a discharge capacity required.

Next, the mixed powder is poured into a vessel suitable for stirring, and while the mixed powder is stirred in the vessel, an alkali aqueous solution is added to the stirred system to obtain a uniform mixture system.

In this process, the stirred, mixed system is heated (preferably to a temperature approximately in the range from 35 to 160° C.) under the condition where oxygen coexists.

In the process of heating, stirring and mixing, a part of cobalt or cobalt compound dissolves in form of complex ions in the alkali aqueous solution, changes to a high-order cobalt oxide containing alkali, thereafter spreads into among grains in form of coating surfaces of nickel hydroxide grains, and form a precursor of a conductive matrix.

Here is typically used a aqueous solution of sodium hydroxide as the alkali aqueous solution; however, a mixed system of a aqueous solution of sodium hydroxide and a aqueous solution of potassium hydroxide or a aqueous solution of lithium hydroxide may be used alternatively.

The alkali concentration is preferably in the range from 1 to 14N, approximately, to smoothly promote dissolution and change to complex ions of the cobalt compound, etc. or to facilitate formation of the desired conductive matrix.

The heating means is not limited to a specific means, but microwaves are effective from the viewpoint of improving the utilization factor of the active material.

More specifically, if microwaves are used as the heating source, they vibrate water molecules in the mixed, stirred system and uniformly heat the powder component like nickel hydroxide grains. As a result, a conductive matrix is evenly formed on surfaces of nickel hydroxide grains.

Additionally, when microwaves are used as the heating source, it is appreciated that the microwave energy supplied tends to enhance the surface activity by producing defects in the crystal structure of nickel hydroxide grains or changing the state of micropores.

When microwaves are used as the heating source, the length of time for irradiation of microwaves is preferably set to approximately 20 minutes.

After that, 100 parts by mass of nickel hydroxide grains coated by the cobalt high-order oxide, 500 parts by mass of a 10 mol/l aqueous solution of sodium hydroxide and 500 parts by mass of a 12 mass % sodium hypochlorite aqueous solution are mixed, heated to the temperature of 800° C. and stirred.

After the heating and the stirring, the precipitate obtained is washed and dried, thereby to obtain a anode active material of nickel oxyhydroxide grains coated by high-order cobalt.

The enclosed nickel-zinc primary battery according to the invention may next undergo the processing for improving the capacity holding coefficient during its storage by adding Y, Er, Yb and Ca compounds to the anode active material of that nickel compound.

Such compounds used in the invention include, for example, metal oxides such as $Y_2O_3$, $Er_2O_3$, $Yb_2O_3$ and metal fluorides such as $CaF_2$.

These metal oxides and metal fluorides can be used by the amount of 0.1 to 10 mass % or preferably 0.1 to 2 mass % with respect to the nickel hydroxide, etc. used as the anode active material.

If the mixed quantity of such metal oxides or metal fluorides is below that range, the storage property will not be improved. If the mixed quantity is over that range, the quantity of the anode active material will undesirably decrease so much and will make it difficult to realize a high-capacity model.

In the present invention, in order to add metal oxides or metal fluorides to the nickel compound such as nickel hydroxide, it can be attained by adding grains of those metal oxides or metal fluorides to nickel hydroxide grains dispersed in an aqueous medium.

Here is explained a compressed nickel compound anode for a battery, which is suitable for use in the enclosed primary battery according to the invention.

This anode is fabricated by compression molding of a mixture for the anode mixture containing nickel compound grains as the anode active material, and the nickel compound grains used are characterized in having the form of balls or semi-balls or being an aggregation of both.

From the viewpoint of high-density packing in the process of compression molding, the nickel compound grains preferably have a mean grain size in the range from 1 to 50 μm.

Further explained below are anodes and their production methods according to the embodiment.

(Anode Active Material: Ball-shaped Nickel Oxyhydroxide)

Nickel oxyhydroxide is preferable as the material of the nickel compound anode active material used in the anode.

The nickel oxyhydroxide grains can be shaped into balls or semi-balls by using the production method explained below.

Ball-shaped grains of the anode active material can be increased in packing density upon compression molding, and they are preferable for use in inside-out type batteries because high-capacity batteries can be realized.

More specifically, by using ball-shaped crystals of nickel oxyhydroxide, the packing density is remarkably improved, and a satisfactory value around 2.7 to 3.5 $g/cm^3$ can be obtained.

The mean grain size of nickel compound grains used is preferably in the range from 1 to 50 μm because it is the mean grain size suitable for high-density packing in compression molding.

The nickel oxyhydroxide compound may contain zinc and cobalt alone, or both, in a eutectic form.

The eutectic nickel oxyhydroxide is preferable because its crystalline structure is less liable to change.

Especially when zinc is incorporated in the crystal, the crystallographic property of nickel oxyhydroxide can be improved, and crystal swelling upon oxidation or deoxidization, i.e. changes in volume, can be minimized. These advantages largely contribute to designs of batteries with a low amount of electrolytic solution.

In case of nickel-zinc batteries made by combining a zinc pole with a nickel oxyhydroxide pole, there is employed a means for preventing self-discharge of the zinc pole by dissolving zinc oxide into an electrolytic solution to the saturation point. Non-eutectic nickel oxyhydroxide, however, absorbs zinc ions into the electrolytic solution during its storage, and this effect will decrease.

In this case, the adverse affect can be removed by using nickel oxyhydroxide previously doped with zinc.

By incorporating cobalt into the crystal, the discharge utilization factor of nickel oxyhydroxide can be improved.

When both zinc and cobalt are incorporated in the crystal, the oxygen overvoltage can be increased, and the self-discharge property of the anode can be improved.

Quantity of zinc or cobalt incorporated in nickel oxyhydroxide is preferably in the range from 1 to 10%, or more preferably in the range from 3 to 5%.

If the quantity of zinc or cobalt is less than that range, the battery may suffer swelling of the anode, decrease of the discharge utilization factor, increase of self-discharge of the positive and cathodes, depending on conditions, and the discharge capacity will decrease.

If the quantity exceeds that range, the nickel purity relatively decreases to a degree unsuitable for realization of a high-capacity model.

It is preferable to coat surfaces of nickel hydroxide with a highly conductive, high-order cobalt compound to obtain a complex oxyhydroxide from the viewpoint of ensuring satisfactory electronic conductivity among nickel oxyhydroxide grains.

(Production Method of the Anode Active Material: Production Method of Ball-shaped Nickel Oxyhydroxide)

Nickel oxyhydroxide grains are manufactured through the processes of 1) fabrication of nickel hydroxide, 2) fabrication of nickel hydroxide coated with a cobalt compound, and 3) fabrication of nickel oxyhydroxide coated with a cobalt compound.

The method will be explained in the order of the respective processes.

1) Fabrication of Nickel Hydroxide

Nickel hydroxide is fabricated by first dissolving metallic nickel into an acid and thereafter neutralizing it with an alkali.

The acid used in this process may be an inorganic strong acid such as nitric acid or sulfuric acid, but the use of sulfuric acid is desirable from the viewpoint of minimizing self-discharge after being completed into a battery.

In this process, dissolution by the strong acid may be carried out by adding nickel powder into the sulfuric acid or nitric acid while stirring it.

Still in this process, the step of neutralization by an alkali may be carried out by mixing an aqueous solution of nickel inorganic acid obtained in the preceding step and a strong alkali such as a aqueous solution of sodium hydroxide.

In this process, it is important to control crystals of nickel hydroxide.

In the present invention, desired ball-shaped crystals can be obtained by gradually mixing the aqueous solution of nickel inorganic acid and the aqueous solution of the inorganic alkali while stirring them hard and continuing the stirring while maintaining pH around 11.

As a result, crystals having a mean grain size around 10 µm are obtained.

In this step, the use of ammonium salt in addition to the strong alkali such as sodium hydroxide is preferable for maintaining pH around 11.

By additionally using ammonium slat, grains uniform in grain size and having a refined form of balls can be obtained.

In the neutralization step, temperature is preferably adjusted in the range from 30 to 40° C.

If the temperature decreases below that range, it is undesirable for supplying crystal components.

In contrast, if the temperature exceeds that range, because of the use of the strong acid and strong alkali aqueous solutions, it is not desirable from the viewpoint of the equipment cost for safety and the workability.

In case that the nickel oxyhydroxide according to the invention is used in form of incorporating zinc or cobalt is incorporated in a eutectic form, zinc, cobalt or their compound may be dissolved simultaneously upon dissolving metallic nickel into the strong acid.

2) Fabrication of Nickel Hydroxide Coated with a Cobalt Compound

The nickel hydroxide crystals obtained in the preceding process are next coated by cobalt hydroxide.

Coating by cobalt hydroxide is carried out by heating 5 to 7 parts by mass of a cobalt compound having a mean grain size of 1 to 5 µm with respect to 100 parts by mass of ball-shaped crystals of nickel hydroxide having a mean grain size of 10 µm grains to approximately 60 through 150° C. in a gas atmosphere containing oxygen by means of microwaves, for example, and by spraying an alkali aqueous solution such as sodium hydroxide by the ratio of 5 to 20 parts by mass while stirring it, the cobalt hydroxide compound dissolves into the alkali aqueous solution, once precipitates again in form of $Co(OH)_2$ while nickel hydroxide grains are coated with a film, and thereafter changes to a highly conductive cobalt high-order compound such as $CoOOH$ or $Co_3O_4$.

As a result, highly conductive nickel hydroxide grains having the form of balls and coated by the cobalt compound can be obtained.

The production process of the nickel compound coated by cobalt is explained below in detail.

A predetermined amount of nickel hydroxide grains and cobalt hydroxide grains is first introduced into a mixer, and stirred and mixed therein.

While the interior of the mixer is adjusted to contain an oxygen-contained atmosphere such as the ambient air, a heating means is activated to apply a heat treatment for controlling the temperature of the mixture under stirring and mixing to a predetermined value, and while an alkali aqueous solution of a predetermined concentration is supplied simultaneously from a nozzle, the mixer is driven to mix them.

In this process, uniform mixture of the nickel hydroxide grains and the cobalt compound grains progresses, the alkali aqueous solution simultaneously supplied adheres onto surfaces of the mixture, and a reaction field is formed on surfaces of the nickel hydroxide grains, in which the alkali aqueous solution, cobalt compound grains and oxygen coexist. As a result, cobalt compound grains changes to a high-order oxide, and it coats the surfaces of the nickel hydroxide grains.

The cobalt compound grains may be any of metallic cobalt grains, cobalt hydroxide grains, cobalt trioxide grains, cobalt tetroxide grains, cobalt monoxide grains, and a mixture of two or more kinds of them.

In this case, the content of cobalt compound grains in that grain system is preferably adjusted in the range from 0.5 to 20 weight %.

If it is less than 0.5 weight %, formation of the conductive matrix on surfaces of the nickel hydroxide grains will be insufficient, and the utilization factor will not increase. If it is more than 20 weight %, then the relative ratio of the nickel hydroxide grains will decrease and will lower the discharge capacity.

Usable as the alkali aqueous solution are sodium hydroxide aqueous solution, potassium hydroxide aqueous solution, their mixture, and mixture of lithium hydroxide aqueous solution with the above-mentioned system ed solution. Concentration of this alkali aqueous solution is preferably adjusted in the range from 1 to 14 N.

If the concentration is lower than 1 N, its solubility for cobalt compound grains contained in the mixture decreases, formation of the conductive matrix does not develop sufficiently, and the utilization factor of the active material cannot be increased. If the concentration is higher than 14N, the alkali aqueous solution increases the viscosity, cannot penetrate deep into the grain system sufficiently, and cannot dissolve cobalt compound particles sufficiently.

Quantity of the alkali aqueous solution used is preferably adjusted in the range from 5 to 20 parts by mass relative to 100 parts by mass of the grain system.

If it is less than 5 parts by mass, it is difficult to dissolve the whole amount of the cobalt compound grains, and the utilization of the active material obtained is not improved. Additionally, the capacity recovery factor after storage of a battery manufactured by using the active material does not rise so much.

If the quantity is more than 20 parts by mass, the grain system will be granulated. Thus the quantity used is preferably in the range from 10 to 15 parts by mass relative to 100 parts by mass of the grain system.

3) Fabrication of Nickel Oxyhydroxide Coated by a Cobalt Compound

The nickel hydroxide coated by the cobalt compound is oxidized into nickel oxyhydroxide coated by the cobalt compound by adding water to it to form of a slurry, next adding an oxidizing agent to oxidize it.

In this process, quantities of the nickel hydroxide grains coated by the cobalt compound and water are preferably adjusted to the ratio of 100 parts by mass of nickel hydroxide grains coated by the cobalt compound and 5 to 30 parts by mass of water. As the oxidizing agent, sodium hypochlorite, for example, may be used in the present invention.

Sodium hypochlorite may be used in form of a aqueous solution of a concentration in the range from 5 to 15%, or more preferably in the range from 10 to 12%. If the concentration is lower than that range, it is undesirable from the viewpoint of oxidation of nickel hydroxide coated by the cobalt compound. If the concentration exceeds that range, it is undesirable for obtaining cobalt-coated nickel oxyhydroxide because the solution becomes significantly unstable against air, heat and light.

Quantity of the oxidizing agent added to the slurry of cobalt-coated nickel hydroxide grains is preferably adjusted in the range from 105 to 120 in equivalent weight with respect to nickel hydroxide.

As a result, nickel hydroxide can be reliably transformed to nickel oxyhydroxide.

(Anode Mixture)

The anode in the present invention is typically made by mixing a anode active material, conductive material electrolytic solution, binder, etc. to prepare a anode mixture, and shaping it into a anode mixture compact.

(Fabrication of the Anode Mixture)

For example, using given source materials, complex nickel hydroxide grains having a cobalt high-order oxide on their surfaces are prepared. Then an oxidizing agent is added to obtain complex nickel oxyhydroxide with the cobalt high-order oxide.

The product thus obtained can be confirmed to be complex nickel oxyhydroxide grains through identification by XRD and by confirming through back titration of ammonium ferrous sulfate/potassium permanganate that substantially all quantity of Ni has become trivalent.

Additionally, the Ni purity of the complex nickel oxyhydroxide at that time is measured by EDTA titration or ICP analysis to use the measurement as the basis data of the later design of the battery.

The complex nickel oxyhydroxide grains having the cobalt high-order oxide on surfaces thereof are used as the anode active material. If necessary, carbon particles, for example, are mixed as a conductive material, an alkali electrolytic solution is further added, and a binder, if necessary, is further mixed, thereby to obtain the anode mixture.

The anode mixture is shaped by a press, for example, into a hollow cylindrical shape having an outer diameter substantially equal to the inner diameter of the metal can, thus to obtain the anode mixture compact.

In the molded anode mixture, anode active material grains and conductive material grains are bound together, and the grain boundaries are filled by the electrolytic solution.

In the anode mixture compact is made up of the anode active material, collector and electrolytic solution, composition of respective components is determined taking account of the mold strength and other factors.

Since information about the density of the compact is required for designing the battery, it must be measured.

In the present invention, the anode material (anode mixture) preferably contains carbon grains to improve the electrical conductivity of the anode.

Usable as the carbon grains is carbon black such as graphite, Ketjen black or acetylene black.

Composition of carbon grains is preferably adjusted to a value not larger than 15 mass %, and the range of anode active material to carbon grain being 10:3 through 10 (in mass ratio) is especially recommended.

If the composition ratio of carbon grains is higher than that value, because of a relative decrease of the quantity of the active material may render the battery unsuitable for a high-capacity model. In contrast, if the composition ratio of carbon grains is lower than that range, the electronic conductivity relative decreases, and the battery will become unsatisfactory in high-output property.

In the present invention, it is especially preferable to choose, as carbon grains to be mixed, those having a specific surface area in the range from 1.0 to 30 $m^2/g$, especially in the range from 10 to 200 $m^2/g$ or more preferably in the range from 0 to 100 $m^2/g$.

In the above-explained case, if the specific surface area is less than 1.0 $m^2/g$, the grain size is slightly larger than desired, and therefore, the collecting efficiency decreases and a sufficiently excellent high-efficiency discharge cannot be obtained.

If the specific surface area exceeds 300 $m^2/g$, then the carbon grains are readily oxidized, and carbon ions generated accelerate the self-discharge and invites a slight decrease of the discharge capacity. Therefore, it is recommended to select carbon grains in the above-mentioned range.

In case of those carbon grains, its quantity to be mixed is preferably adjusted in the range of 3 through 15 mass %, more preferably in the range of 5 through 12 mass %, or more preferably in the range from 7 to 10 mass %.

If the quantity of carbon grains contained in the anode mixture is less than 3 mass %, it is somewhat difficult to obtain a sufficient collecting efficiency, and the high-efficiency discharge property tends to slightly decrease.

If it exceeds 15 mass %, it results in decreasing the quantity of the anode active material and hence invites a light decrease of the battery capacity.

Carbon grains may be a mixed system of two kinds of carbon grains different in specific surface area. In this case, it is especially desirable that the carbon grains are a mixed system of 25 through 75 mass % of carbon grains having a specific surface area in the range from 1.0 to 30 $m^2/g$ and 75 through 26 mass % of carbon grains having a specific surface area in the range from 30 to 300 $m^2/g$.

If the quantity of carbon grains having a specific surface area of 30 through 300 $m^2/g$ is less than 25 mass % (and the quantity of carbon grains having a specific surface area of 1.0 to 30 $m^2/g$ exceeds 75 mass %), the collecting efficiency slightly decreases, and a tendency of a slight decrease is seen in the discharge capacity.

In contrast, if carbon grains having a specific surface area of 30 to 300 $m^2/g$ exceed 75 mass % (and carbon grains having a specific surface area of 1.0 through 30 $m^2/g$ are less than 25 mass %), it not only invites an increase of the material cost, but also causes the self-discharge to be accelerated by carbon ions generated by oxidation of carbon fine particles, and a tendency of a slight decrease is noted in the discharge capacity.

More specifically, as to configuration of the anode by the anode mixture and the property of the electrode or battery, the specific surface area of carbon grains largely affects the battery property, and combination and contents of carbon grains are deeply related to improvements of the batter property. Therefore, appropriate selection and adjustment of the specific surface area of carbon grains as the conductive material, the mixed system of carbon grains different in specific surface area, quantity of carbon grains contained in the anode mixture, and so forth, not only improve the high-efficiency discharge property but also contribute to realization of a high-capacity model.

The nickel hydroxide compound as the major component of the anode mixture in this embodiment is, for example, nickel hydroxide, nickel oxyhydroxide, mixed system of nickel hydroxide and nickel oxyhydroxide (hybrid system), or a eutectic of any of them and zinc or cobalt.

As those nickel hydroxide compound grains, those having a mean grains size of 5 through 15 μm are typically used.

In the explanation given above, carbon grains contained in the anode mixture may be either those substantially constant or uniform in specific surface area or those prepared by mixing different kinds of carbon grains different in specific surface area as explained above.

(Molding of the Anode)

Ball-shaped nickel oxyhydroxide grains according to the invention are next molded into a anode through the following processes.

1) Mixture of Anode Mixture Components

The anode mixture can be obtained by mixing an electrically conductive material, binder as a anode mixture additive, lubricant, and electrolytic solution, etc. with the anode active material.

The conductive material as a component of the anode mixture is used to lower the internal resistance of the anode mixture, and graphite is typically used.

The binder is used to enhance the shape keeping ability upon molding the anode mixture and to maintain the shape keeping ability during molding and inside the battery. Usable as the binder are polyethylene, polypropylene, polytetrafluoroethylene, and so forth.

The lubricant is used to improve the slide between the anode mixture compact and the mold used for molding, and thereby to improve the production yield.

Usable as the lubricant are zinc stearate, calcium stearate, ethylene bis-stearamide, and so on. The electrolytic solution is used to enhance the ion conductivity in the anode mixture and to enhance the molding performance.

Here is preferably used the same electrolytic solution as that used to maintain the ion conduction between the positive and cathodes of the battery.

40% KOH aqueous solution is a preferable electrolytic solution.

Composition ratio of these components of the anode mixture is preferably adjusted to 90-92:4-6:0.05-0.5:0.05-0.30:4-6 in mass ratio as the anode active material:conductive material:binder:lubricant:electrolytic solution.

These components are mixed by a stirrer such as a rotary mixer or Henshcel mixer, for example.

2) Roller Compaction Processing

The anode mixture prepared in the preceding process is next compressed by a roller compactor and increased in packing density for granulation. The roller compactor is configured to supply the anode mixture to between double rolls, pressurize it and increase the packing density. Its compression stress is preferably in the range from $0.5 \times 10^4$-$5 \times 10^4$ N/cm calculated by dividing the applied force by the roller width, or more preferably in the range from $1.5 \times 10^4$-$3.5 \times 10^4$ N/cm.

This roller compactor can improve the throughout in proportionally to the square of the radius and the roll width.

3) Granulation Processing

The anode mixture just after the roller compaction processing exhibits the form of a compressed lump.

In order to preparing a compact from it, it must be once granulate into grains.

For this purpose, granulation processing is carried out with a granulator using double rolls having mating projections on their surfaces.

The anode mixture in form of a compressed lump is introduced into the granulator, and crushed into grains.

Diameters of the grains obtained range from 10 and several μm to 1 mm, approximately.

4) Classification Processing

Anode mixture grains obtained in the preceding process are classified into sizes. In the present invention, grains in the range from 200 to 800 μm can form a anode mixture compact with a high packing density.

Granulated powder smaller than 200 μm is not suitable because of much time required for measuring granulated powder upon molding by a mold.

Granulated powder exceeding 800 μm is also unsuitable because the compact varies in weight upon molding by a mold.

It is possible to establish in a mass production plant a granulation system in which grains with large diameters sifted out by the classification processing are returned to the granulation processing and re-used, whereas grains with small diameters are returned to the roller compactor processing step and re-used.

5) Molding

The anode mixture grains granulated in the preceding process are next molded into a anode compact by using a mold.

The anode mixture for the inside-out type has a hollow, cylindrical shape, and has a central mandrel. Its molding is carried out by filling the anode mixture grains in a cylindrical mold having a predetermined volume and driving a male mold. The molding pressure used here preferably ranges from $0.5 \times 10^8$ through $9.8 \times 10^8$ Pa. If the molding pressure is lower than that range, the packing density necessary for the anode mixture cannot be obtained, and it will become difficult to hold the grains in contact with each other. Therefore, the battery, when completed, cannot provide a predetermined discharge capacity. In contrast, if the molding pressure exceeds that range, the electrolytic solution is difficult to penetrate into the anode mixture, and will decrease its utilization factor.

By using the anode active material grains explained above, excellent effects have been confirmed, including that the molding density is improved for the reasons explained below and that the battery made by using them is improved in discharge capacity.

1) Since the grains form ball-shaped crystals, the crystals do not break even when a greater pressure than conventional is applied from the roller compactor. Therefore, the utilization factor does not decrease even in an increased molding density, and the real discharge capacity is improved significantly.

Conventionally, the molding density could not be increased because the grains had indeterminate shapes.

Additionally, when the molding density was increased, stress concentration was serious, and crystal destruction of the active material occurred at that portion and decreased the utilization factor. Therefore, the real discharge capacity could not be improved even when the molding density was increased.

2) Since the grains are ball-shaped, voids between crystals after packing decrease. Therefore, the molding density is improved significantly.

3) Since the compact having an equivalent molding density is obtained even when the roller compactor supplied a relatively low pressure, the workability has been improved remarkably.
4) The yield from the classification processing has been improved. That is, as compared with the primary yield around 40% in case of manganese dioxide, the primary yield of nickel oxyhydroxide according to the invention has been improved to approximately 60%, and the economical efficiency has been improved.
5) The compact has been improved in strength. As a result, the molding yield has been improved, cracking or chipping upon introduction of the anode compact into the can has been reduced extremely, the powder dust work environment has also been improved, and the economical efficiency has been improved.

(Modification of the Anode Mixture)

In the enclosed nickel-zinc primary battery according to the invention, in case of the anode mixture of the type containing the anode active material made of the nickel hydroxide compound and graphite as its major components, a stearic compound is preferably mixed into the anode mixture.

In this case, the stearic compound is preferably mixed by a ratio in the range from 0.05 to 0.5 mass %, especially in the range from 0.1 to 0.3 mass % in the anode mixture.

If the composition of the stearic compound exceeds that range, the molding workability is not improved sufficiently, and at the same time, it oppresses the quantity of the anode active material. This results in inviting a tendency of slightly decreasing the battery capacity, disadvantages in cost, disadvantages also from the viewpoint of the electric capacity of the battery finally assembled, and adverse affection to the heavy-load discharging property.

On the other hand, if the stearic compound is less than that range, due to a decrease of the effect of lubricity and fluidity of the granular mixture by addition of the stearic compound, the molding workability slightly decreases, the production yield also decreases slightly, and the mass productivity is damaged.

The stearic compound to be mixed is preferably at least one substance selected from zinc stearate and calcium stearate.

Since zinc stearate and calcium stearate are excellent in lubricity and the intended object is satisfied by addition of a relative small amount of them, they do not invite a decrease of the discharge capacity of the battery.

Still regarding the quantity of those materials to be added, composition in that range is desirable for mass-producing inexpensive nickel-zinc batteries having a high-efficiency discharge property and a high capacity as compared with conventional alkali-manganese batteries.

The stearic compound is preferably used in form of powder, and its means grain size is preferably in the range from 1 to 10 μm.

If the mean grain size is smaller than that range, it is difficult to handle, and it takes time to uniformly coat the surfaces of the granular anode mixture.

In contrast, if the mean grain size is larger than that range, the stearic compound cannot coat the surfaces of the anode mixture grains sufficiently and cannot perform the effect of improving the lubricity.

For production the compact made up of the anode active material such as the above-explained nickel hydroxide compound and the anode mixture prepared by mixing stearic compound to graphite, the following method can be shown ass an example, which includes the step of granulating the mixture for the anode mixture containing a nickel hydroxide compound and graphite as its major components into a granular form, and the step of adding a stearic compound to the granular mixture.

Figure 2:
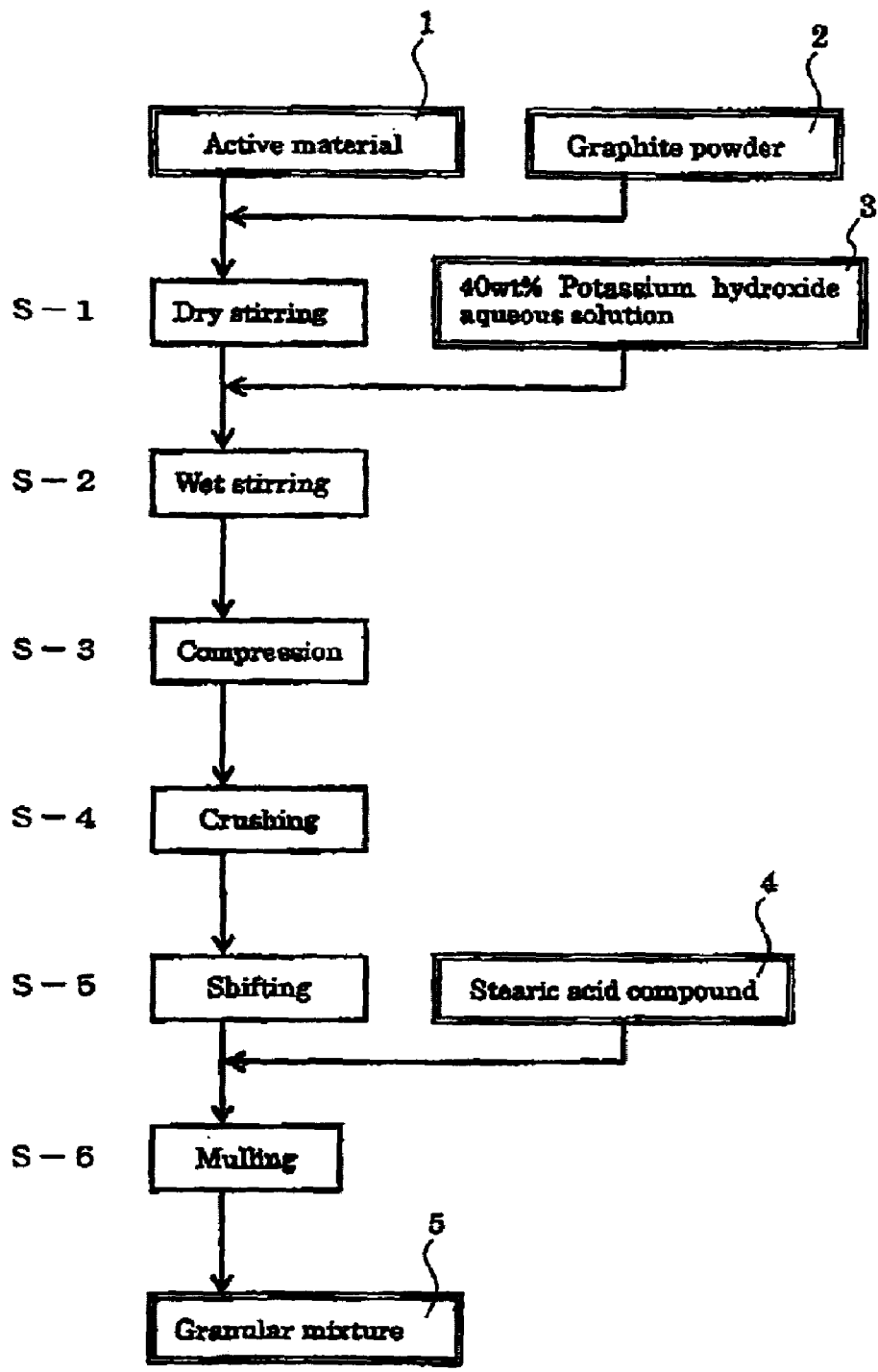
FIG. 2 is a flowchart showing steps of a modification of production method of a enclosed nickel-zinc primary battery according to the second aspect of the invention.

FIG. 2 shows this method as a flowchart in the order of its steps.

(S1: Dry Stirring)

Graphite powder is added to nickel oxyhydroxide powder as the anode active material, and they are stirred by dry stirring using a universal mixer.

The stirring time is about five minutes.

In this process, the ratio of graphite to be added ((mass of graphite powder)/(mass of active material+mass of graphite powder)) is preferably in the range from 3 to 10 mass %, or more preferably in the range from 5 to 8%. If the content of graphite exceeds that range, they can be molded better an easier, but the discharge capacity decreases and the intended object is not satisfied.

If the content of graphite is less than that range, the discharge capacity certainly increases, but the conductivity in the anode active material decreases, and it may degrade the heavy-load discharge property.

(S2: Wet Stirring)

An electrolytic solution is added to 100 parts by mass of the mixed powder obtained by the dry stirring, and they are stirred by wet stirring using a universal mixer.

Through this process, powder components of the anode mixture mixed by dry stirring are united together into a moldable condition.

Quantity of the electrolytic solution used in this process is about 2 through 7 parts by mass relative to 100 parts by mass of the anode mixture components, and stirring time of about five minutes will be sufficient.

(S3: Compression)

The mixture obtained is next compressed into a plate form by a roller press.

At that time, the roller press is adjusted in pressure, etc. to limit the thickness of the plate-like compressed mixture within 1 mm.

(S4: Crushing)

The plate-like compressed mixture is next crushed by a crusher.

(S5: Sifting)

The mixture is next classified by an automatic sifter of 22 through 100 meshes to separate the anode mixture grains having grain sizes in the range from 150 to 710 μm approximately.

(S6: Mulling)

A predetermined amount of stearic compound powder is next added to the granular mixture obtained in the preceding step, and they are mulled. Mulling time of approximately five minutes will be sufficient.

(Granular Mixture)

Through that step, a granular mixture containing stearic compound powder adhering onto surfaces of grains is obtained.

Thereafter, the granular anode mixture is packed in a mold, and shaped into a hollow, cylindrical form by compression molding. Then it is assembled into a battery through a known battery production process.

[Cathode Material]

The cathode material used in the present invention contains the cathode active material of a zinc alloy as its major component. Here are usable anhydrous silver and lead-free zinc gel that are used in known manganese dioxide-zinc primary batteries.

(Fabrication of Cathode Mixture)

For the cathode, anhydrous silver and lead-free zinc gel used in cathodes of known manganese dioxide-zinc primary batteries can be used. Also the cathode gel density is necessary as data for designing batteries, it is preferably measured beforehand for production batteries.

The cathode material is preferably a gel for handling. The cathode material can be readily gelled by adding an electrolytic solution and a gum to a cathode material.

The zinc alloy used in the present invention may be a zinc alloy not containing either mercury or lead, which is known as a mercury-freed zinc alloy.

More specifically, a zinc alloy containing 0.06 mass % of indium, 0.014 mass % of bismuth and 0.0035 mass % of aluminum is desirable because of the effect of preventing generation of hydrogen gas.

Indium and bismuth are especially desirable for improving the discharge performance.

A reason why the use of a zinc alloy instead of pure zinc as the cathode active material lies in that it delays the self-dissolution speed in the alkali electrolytic solution, prevents generation of hydrogen gas inside the battery when completed as a enclosed battery product, and thereby prevents accidents by liquid leakage.

The zinc alloy is preferably in form of powder to increase the surface area and to cope with large-current discharge.

The zinc alloy used in the present invention preferably has a mean grain size in the range from 100 to 350 μm.

If the mean grain size is smaller than that 100 μm, then it makes uniform mixture of the electrolytic solution and the gelling agent difficult, and at the same time, the active surface tends to invite instable behaviors such as liability of being oxidized.

If the mean grain size exceeds 350 μm, a decrease of the surface area may make it difficult to cope with large-current discharge.

Moreover, if the mean grain size is smaller than that range, the material is difficult to handle upon assembling the battery, it is difficult to uniformly mix the electrolytic solution and the gelling agent, and the active surface is liable to be oxidized and instable.

The gum used in the present invention may be polyvinyl alcohol, polyacrylate, CMC or alginic acid.

Polyacrylate is especially preferable because of its excellent anti-chemical property against strong alkali.

[Electrolytic Solution]

The electrolytic solution used in the present invention is preferably a aqueous solution using alkali salt such as potassium hydroxide or sodium hydroxide as the solute. Potassium hydroxide is especially preferable to use.

In the present invention, alkali salt such as potassium hydroxide is dissolved in water to form the electrolytic solution, but preferably, a zinc compound is additionally added to the electrolytic solution.

As the zinc compound, there are compounds such as zinc oxide and zinc hydroxide. Among them, zinc oxide is especially preferable.

A reason of the use of an alkali aqueous solution containing at least a zinc compound as the electrolytic solution lies in that self-dissolution of the zinc alloy in the alkali aqueous solution is much less than that of acidic electrolytic solutions and that self-dissolution of the zinc alloy in the alkali electrolytic solution is further suppressed by generating zinc ions beforehand by dissolving a zinc compound such as a zinc oxide.

Optimum concentration of the electrolytic solution is in the range from 7 to 11 mol/l to obtain a high electrical conductivity.

Thus, in the present invention, an excellent, high-capacity battery is obtained by optimizing the active material and the electrolytic solution in the nickel-zinc primary battery as explained above.

[Production Method of the Battery]

A production method of the enclosed nickel-zinc primary battery according to the invention will be explained below in detail, following to its process.

(Processing of the Anode Case]

Here is prepared a cylindrical anode case for a battery of the LR6 type (size AA) according to the JIS standard obtained by drawing a metal plate prepared by plating a surface of an iron base material with nickel.

Internal resistance of the battery can be reduced by first spraying a paint containing dispersed approximately 20 mass % of graphite powder onto the inner wall surface of the anode case to coat it, then drying the paint by vaporizing the solvent, and thereby forming a graphite-based layer on the inner wall surface of the anode case.

(Formation of the Anode Mixture (Anode))

After that, complex nickel hydroxide grains laying a cobalt high-order oxide on their surfaces are prepared by using given source materials, and an oxidizing agent is added to obtain complex oxyhydroxide nickel mixed with the cobalt high-order oxide.

The product thus obtained can be confirmed to be complex nickel oxyhydroxide grains through identification by XRD and by confirming through back titration of ammonium ferrous sulfate/potassium permanganate that substantially all quantity of Ni has become trivalent.

Next mixed and stirred are powder of a anode active material and powder of artificial graphite that is a conductive agent and provides moldability and separability from the mold.

After that, using a mold for molding the anode mixture, which meets battery of the JIS standard LR6 type (size AA), the anode mixture of a hollow, cylindrical shape is formed by compression molding.

(Formation of the Cathode)

By stirring and mixing mercury-freed zinc alloy powder, zinc oxide-added potassium hydroxide aqueous solution (electrolytic solution) and gelling agent under s reduced pressure, a gel zinc cathode is prepared.

(Formation of a Separator)

Nonwoven fabric of polyethylene resin fibers or other fibers is rolled and partly bonded by heat welding, thereby to obtain a cylindrical body.

Besides, a round plate is punched out from, for example, a polyethylene resin sheet, and the round plate is bonded to one end of that cylindrical body by heat welding to obtain the cylindrical separator having a bottom.

(Assemblage of the Alkali Battery)

The cylindrical anode mixture, gel zinc cathode and separator thus prepared are put and disposed inside the anode case also serving as the anode terminal, which is for a JIS standard LR6 type battery, to make up a size AA alkali battery.

The production method according to this embodiment is characterized in controlling the environment after fabrication of the anode active material and preventing its deterioration.

The anode active material, which is a nickel high-order oxide herein, is made up of nickel oxyhydroxide grains as its major component. This compound, however, is sensitive to moisture, and if nickel high-order oxide is exposed to an environment containing moisture, it interacts with moisture and results in being deoxidized and changed in quality to nickel hydroxide.

Then nickel compound, when completely deoxidized to nickel hydroxide, will no longer generate electromotive force, and cannot form a battery.

Therefore, for using a nickel high-order oxide as the anode active material to assemble a battery, the nickel high-order oxide is preferably stored in dry air.

However, a very big system will be necessary for completely removing moisture from air, and it will worsen the workability in the battery production process.

Taking account of it, a review was made to realize a means for suppressing interaction between the nickel high-order oxide and moisture by using a means replacing the means of removing moisture from air, and the invention of this method has been completed.

That is, the method prevents a change in quality of the nickel high-order oxide by managing its storage condition such that it is not exposed to an environment of 30° C. or a higher temperature before the step of assembling the battery using the nickel high-order oxide.

Facilities for this purpose can be accomplished by cooling the room temperature of the place for storing and controlling the anode active material.

A typical air-conditional system will be acceptable for this purpose.

A system capable of decreasing the humidity simultaneously with temperature adjustment will be more preferable.

(Modification of the Battery Production Method)

Next explained is a preferable method for production the enclosed nickel-zinc primary battery according to the invention.

This method is characterized in carrying out hot aging after assemblage of the battery in the production process of the battery.

The hot aging is preferably continued for 24 to 72 hours at temperatures in the range from 40 to 80° C.

When the temperature=$\theta$[° C.] and the time=t [time], OCV can be adjusted (OCV can be decreased) easily by carrying out the aging by combination of the ranges of ($\theta$:t)=(40-80:24-72).

A typical conventional method of adjusting OCV is to directly connect an arbitrary constant resistor as a coin type manganese-lithium primary battery and thereby bring about partial discharge.

This method, however, needs a system such as a discharge unit and s voltage control system for preventing excessive discharge.

That is, the cost of such a system increases the cost of the final product.

Reasons why the voltage adjustment by partial discharge using direct connection of a constant resistor include (1) the use of an active material not liable to self-discharge as the cathode and (2) the use of an active material not liable to self-discharge as the anode, regardless of whether they are aqueous solution systems or not.

As to (1) above, lithium other than the group of aqueous solutions and zinc of the group of aqueous solutions are examples of the cathode active material.

Lithium other than the group of aqueous solutions, when combined with propylene carbonate (PC), for example, forms a coat of lithium carbonate compound on its surface, and becomes less liable to self-discharge.

Zinc of the group of aqueous solutions, when combined with potassium hydroxide (KOH wager solution), for example, forms a coat of zinc hydroxide compound, and becomes less liable to self-discharge.

Regarding (2) above, an active material more electronegative than the oxidizing or deoxidizing potential of the electrolytic solution is typically used.

For example, manganese dioxide other than the group of aqueous solutions and manganese dioxide of the group of aqueous solutions are its examples.

Each of them can be combined with, for example, PC or electrolytic aqueous solution such as KOH aqueous solution. However, they both are more electronegative than the oxidizing and deoxidizing potential of the electrolytic solution, electrochemical self-discharge does not occur.

Therefore, it has been efficient to lower the potential of the positive or cathode, or their both potentials, by carrying out partial discharge by direct connection of a constant resistor.

The nickel-zinc primary battery under development by the Inventors uses an alkali electrolytic solution containing KOH as its major component.

Nickel oxyhydroxide is more electropositive than the electrolytic solution (water) oxidizing and deoxidizing potential, and runs to self-discharge.

Taking it into account, the invention provides a method of adjusting OCV by bringing about appropriate self-discharge by factors of temperature $\theta$ and time t, and is effective for eliminating an additional system such as constant resistor discharge.

Next explained is a preferable production method of a enclosed nickel-zinc primary battery of a version using a nickel high-order oxide such as nickel oxyhydroxide containing zinc and cobalt alone, or both, in a eutectic form as the anode active material.

This method is characterized in adjusting the storage temperature of the nickel high-order oxide at or below 30° C. before assemblage of the battery, and reliably controls the nickel high-order oxide for the anode with a simple system in the production process of the enclosed nickel-zinc primary battery, thereby to prevent a decrease of the capacity by self-discharge in the production process of the battery.

The anode active material may be complex nickel oxyhydroxide containing zinc and cobalt alone, or both, in a eutectic form, coated by a cobalt high-order oxide layer.

EXAMPLES

Next explained is the present invention by way of examples.

Examples 1 Through 5 and Comparative Examples 1 Through 4

Complex nickel hydroxide grains having a cobalt high-order oxide on their surfaces were prepared by adding 7 parts by weight of $Co(OH)_2$ to 100 parts by weight of nickel hydroxide grains doped with 5% of Zn and 1% of Co, and heating with microwaves while stirring them and spraying 15 parts by weight of 10N NaOH. Sodium hypochlorite was further added to that system to promote oxidation, thereby to obtain complex nickel oxyhydroxide mixed with the cobalt high-order oxide.

The product thus obtained was confirmed to be complex nickel oxyhydroxide grains through identification by XRD and by confirming through back titration of ammonium ferrous sulfate/potassium permanganate that substantially all quantity of Ni had become trivalent.

Values of the anode theoretic capacity, cathode theoretic capacity, cathode/anode theoretic capacity ratio of the batteries made are listed in Table 1.

After the completed batteries were exposed to an atmosphere of 20° C. for three days to render them active, constant current discharge of 150 mA 1.0V cut-off was carried out in an atmosphere of 20° C.

Thereafter, anode utilization factors were calculated by dividing the obtained discharge capacities by theoretic capacities of the anodes.

A result thereof is shown in Table 1.

TABLE 1

| Example No. | Anode theoretic capacity (mAh) | Cathode theoretic capacity (mAh) | Ratio between cathode/anode theoretic capacities | Ratio of electrolytic solution (ml/Ah) | Anode utilization factor (%) |
|---|---|---|---|---|---|
| Example 1 | 2510 | 2510 | 1.0 | 1.3 | 87 |
| Example 2 | 2290 | 2970 | 1.3 | 1.3 | 86 |
| Example 3 | 2100 | 3350 | 1.6 | 1.3 | 86 |
| Example 4 | 2100 | 3350 | 1.6 | 1.6 | 90 |
| Example 5 | 2100 | 3350 | 1.6 | 1.0 | 80 |
| Comparative Example 1 | 1890 | 3780 | 2.0 | 1.6 | 90 |
| Comparative Example 2 | 1510 | 4530 | 3.0 | 1.6 | 89 |
| Comparative Example 3 | 2100 | 3350 | 1.6 | 0.8 | 42 |
| Comparative Example 4 | 2100 | 3350 | 1.6 | 1.7 | 90 |

Additionally, the Ni purity of the complex nickel oxyhydroxide at that time was measured by EDTA titration and ICP analysis, and the measurement was 54%.

Carbon and an electrolytic solution were added to the anode active material obtained by that method, and they were molded into a anode mixture.

Respective components of the anode mixture were mixed by quantities shown below in weight ratio, taking account of the molding strength, etc. of the anode mixture.

That is, complex nickel oxyhydroxide:carbon:12N KOH=100:6:5, and the molding density at that time was 3.22 g/cm$^3$.

For the cathode, a cathode mixture was prepared by using anhydrous silver and lead-free zinc alloy of cathodes of known manganese dioxide-zinc-primary batteries. Zinc gel composition of the cathode mixture was as follows.

Zinc: water-absorbing binder:12N KOH=100:1.5:55

Zinc gel density at that time was 2.70 g/cm$^3$.

The electrolytic solution used was a 12N KOH aqueous solution.

The anode mixture and the cathode gel thus obtained were packed into a can while measuring their masses, and an electrolytic solution is poured by the ratio of 1.3 ml/Ah relative to the theoretic capacity of the anode. Then, as the configurations shown in Table 1 as Examples 1 through 3, the can opening was sealed with a seal member incorporating a metal plate/cathode top having a collector/gas release vent, thereby to obtain the AA size nickel-zinc primary battery shown in FIG. 1.

Other batteries were made as Examples 4, 5, and comparative examples 3 and 4, in the same manner as the battery as Example 3 except that the ratio of the electrolytic solution was adjusted to 1.7, 1.6, 1.0 and 0.8 ml/Ah relative to the theoretic capacity of the anode.

Additionally, batteries as Comparative Examples 1 and 2 were prepared in the same manner as Example 4 except that the ratio between negative/anode theoretic capacities employed in conventional nickel-zinc secondary batteries were changes to 2 and 3.

It can be confirmed from Table 1 that, because the secondary battery designs as Comparative Examples 1 and 2 require a capacity ratio of 2 through 3, they necessarily need the theoretic capacities of the positive and cathodes shown in Table 1 to accommodate them in a battery can body of a limited volume, which results in the batty capacities from 1500 to 1900 mAh.

On the other hand, in case of the batteries of the primary battery design according to the invention, since the capacity ratio can be as low as 1.0 through 1.6, an increase in capacity as much as approximately 70% in maximum relative to the batteries as comparative examples has been proved to be possible.

It is understood from Table 1 that the ratio of the electrolytic solution relative to the anode theoretic capacity is correlated with the utilization factor of the anode that is the capacity regulating pole, and that a value from 1.0 through 1.6 ml/Ah is adequate. In a range (1.7 ml/Ah) exceeding 1.6 ml/Ah, the anode utilization factor has already met, and addition of the electrolytic solution in excess of that will become a volume loss in the limited internal volume of the battery.

In a region (0.8 ml/Ah) below 1.0 ml/Ah, the anode utilization factor drastically decreases, and it is apparently impractical.

It is presumed that it occurs because the electrolytic solution is insufficient and protons cannot sufficiently disperse into nickel oxyhydroxide of the anode.

Examples 6 Though 8 and Comparative Example 5

Two batteries were made as each of the Examples in the same manner as Example 4 except that the composition of the electrolytic solution and the electric conductivity were changed from those of the battery according to Example 4 in Table 1 to those of Examples 6 through 8 in Table 2.

For the purpose of comparison, a battery (Comparative Example 5) having the electric conductivity of 0.16 S/cm was made.

After these batteries were exposed to an atmosphere of 20° C. for three days to render them active similarly to Examples 1 through 5, they were divided to two groups. Batteries of one group were subjected to constant current discharge of 150 mA 1.0 V cut-off in an atmosphere of 20° C. whereas batteries of the other group were subjected to constant current discharge of 150 mA in an atmosphere of 20° C. Thus ratios of utilization factors between them were regarded as capacity holding coefficients after exposure to an atmosphere of 45° C. for two weeks.

Its results are listed in Table 2.

used by diluting the total alkali salt concentration shown in Table 2 from 12 N or 12N+1N=13N to a lower concentration such as 9 through 11.

Moreover, for the comparison purpose, a commercially available AA size manganese dioxide-zinc primary battery (usually called "alkali battery") is purchased and its discharge capacity was evaluated by similar 150 mA/1.0 V cut-off discharge. Thereafter, it was decomposed to determine the quantity of manganese dioxide in the battery, and the utilization factor was evaluated to be 70% from the ratio with respect to the theoretic capacity.

Batteries as Examples 4, 6 and 7 in Table 2 have utilization factors 9ver that of the commercially available alkali battery, and this battery system has been confirmed to be better in discharge rate property.

Examples 9 Through 13

Batteries were made in the same manner as Example 4 of Table 1 except that 0.4 parts by weight of four kinds of metal oxides or metal fluorides, namely $Y_2O_3$, $Er_2O_3$, $Yb_2O_3$ and $CaF_2$, were added.

TABLE 2

| Example No. | Ratio between cathode/anode theoretic capacities | Ratio of electrolytic solution (ml/Ah) | Composition of electrolytic solution | Electrical conductivity (S/cm) | Anode utilization factor (%) | Capacity holding coefficient (%) |
|---|---|---|---|---|---|---|
| Example 4 | 1.6 | 1.6 | 12N KOH | 0.41 | 90 | 85 |
| Example 5 | 1.6 | 1.6 | 12N NaOH | 0.20 | 72 | 95 |
| Example 6 | 1.6 | 1.6 | 12N KOH + 1N LiOH | 0.35 | 85 | 93 |
| Comparative Example 5 | 1.6 | 1.6 | 12N NaOH + 1N LiOH | 0.16 | 30 | 98 |
| Comparative Example 8 | 1.6 | 1.6 | 12N KOH + 1N NaOH | 0.40 | 90 | 91 |

Note that the capacity confirmation current is 20 mA is of 20 mA discharge while the intermediate current is 150 mA current in case of commercially available, typical AA size manganese dioxide-zinc primary batteries.

That is, by 150 mA discharge, qualitative judgment of comparison of a manganese dioxide-zinc primary battery relative to the discharge rate property is possible.

It has been known from Table 2 that the electric conductivity and the anode utilization factor correlate, and a sufficient anode utilization factor is not obtained unless the potential conductivity of the electrolytic solution is 0.2 S/cm or more.

It has also been known that the electrolytic solution added with LiOH and NaOH (or NaOH alone) promises a higher capacity holding coefficient than the electrolytic solution of KOH alone seen in Example 4.

It has been known, however, that if the ratio of LiOH or NaOH rises in the electrolytic solution, since it decreases the electrical conductivity and the anode utilization factor, they have to be appropriately selected and used depending on the purpose of use and the desired property.

As a result, a system having an electrical conductivity not lower than 0.2 S/cm, using KOH as the base and adding at least one of NaOH and LiOH, or a system using NaOH as the base or using NaOH not reaching 12N and added with LiOH, is preferable to use.

Furthermore, in order to ensure an electrical conductivity not lower than 0.2 S/cm by using NaOH or LiOH, it may be The aging condition and the manner of measuring the anode utilization factor and the capacity holding coefficient after completion of experimental batteries were the same as those of the above-explained method.

Results thereof are listed in Table 3.

By comparing the batteries containing oxides of Y, Er and Yb and fluoride of Ca added to their anodes and having the results of Table 3 with the results of Example 4 of Table 2, Examples of Table 3 have been confirmed to be effective for improving the capacity holding coefficient.

It has also been confirmed that Examples of Table 3 have satisfactory anode utilization factors equivalent to that of Example 4.

Especially, the capacity holding coefficient by combination of the batteries having $Y_2O_3$ added to the anodes and 12N KOH+1N NaOH has been confirmed to be very excellent.

This demonstrates that the capacity holding coefficient during storage can be improved by adding Y, Er and Yb oxides or Ca fluoride to the anode while appropriately adjusting the entire concentration of the electrolytic solution not only of the system containing KOH alone but also of the system added with NaOH or LiOH to maintain 0.2 S/cm as the electrical conductivity, without degrading the anode utilization factor.

TABLE 3

| Example No. | Ratio between cathode/anode theoretic capacities | Ratio of electrolytic solution (ml/Ah) | Composition of electrolytic solution | Anode additives (mass %) | Anode utilization factor (%) | Capacity holding coefficient (%) |
| --- | --- | --- | --- | --- | --- | --- |
| Example 9 | 1.6 | 1.6 | 12N KOH | $Y_2O_3$ | 89 | 92 |
| Example 10 | 1.6 | 1.6 | 12N KOH | $Er_2O_3$ | 89 | 90 |
| Example 11 | 1.6 | 1.6 | 12N KOH | $Yb_2O_3$ | 89 | 90 |
| Example 12 | 1.6 | 1.6 | 12N KOH | $CaF_2$ | 90 | 91 |
| Example 13 | 1.6 | 1.6 | 12N KOH + 1N NaOH | $Yb_2O_3$ | 90 | 95 |

Although the Examples shown here were basically of the AA size, they are not limited to it but are applicable to various sizes.

Moreover, although the Examples are shown as using complex nickel oxyhydroxide coated by a high-order cobalt compound as the anode active material, the same effects have been confirmed even when using nickel oxyhydroxide, and the anode active material is not limited to that.

Examples 14 Through 19 and Comparative Examples 6 and 7

(Preparation of the Anode)

Mixed powder was obtained by using 90 mass % of nickel oxyhydroxide powder coated by cobalt oxyhydroxide, mixing 5.4 mass % of graphite powder to it for 10 minutes, then adding 4.6 mass % of a aqueous solution containing 40% concentration of potassium hydroxide, and mixing them for 30 minutes in a universal mixer.

The powder was molded by compression molding into a hollow, cylindrical form having the outer diameter of 13.3 mm, inner diameter of 9.0 mm and height of 13.7 mm, thereby to obtain a anode mixture pellet.

(Preparation of the Cathode)

64.58 mass % of zinc alloy powder containing 0.01 mass % of In, 0.01 mass % of Bi and 0.003 mass % of Al and having a mean grain size in the range from 100 to 300 μm was prepared, and 0.381 mass % of polyacrylic acid was added as a gelling agent and stirred for five minutes in a universal mixer to mix them uniformly.

After that, 0.0006 mass % of tetrabutyl ammonium hydroxide was added to 35 mass % of a aqueous solution containing 35 mass % concentration of potassium hydroxide and containing 3.5 mass % of zinc oxide dissolved, and they were stirred for 10 minutes to disperse it sufficiently. Thereafter, that mixture of zinc alloy powder was gradually added for four minutes, and stirred and mixed under a reduced pressure not exceeding 150 mmHg, and additionally stirred un a reduced pressure not higher than 10 mmHg, there by to obtain a uniform gel cathode.

(Assemblage of the Battery)

Using the gel cathodes obtained in the above-explained manner, size AA alkali batteries shown in FIG. 1 were assembled (Example 14).

For respective LR6 batteries assembled, constant current discharge of 150 mA and 1000 mA was carried out in an atmosphere of 20° C. after aging for two days, and the ratio of discharge capacity relative to the theoretic capacity was evaluated as the utilization factor of the anode active material.

Its results are shown in Table 4.

TABLE 4

| | Anode mass (g) | Volume ratio of non-solid portion relative to Anode active material | Volume ratio occupied by non-solid portion (volume %) | Theoretic discharge capacity (mAh) | 150 mA discharge capacity (mAh) | 1000 mA discharge capacity (mAh) | 150 mA utilization factor (%) | 1000 mA utilization factor (%) |
| --- | --- | --- | --- | --- | --- | --- | --- | --- |
| Example 6 | 8.7 | 0.52 | 32% | 1910 | 1413 | 573 | 74 | 30 |
| Example 14 | 9.0 | 0.46 | 29% | 1980 | 1743 | 852 | 88 | 43 |
| Example 15 | 9.3 | 0.41 | 27% | 2051 | 1825 | 1046 | 89 | 51 |
| Example 16 | 9.6 | 0.36 | 24% | 2121 | 1909 | 1209 | 90 | 57 |
| Example 17 | 10.0 | 0.31 | 22% | 2192 | 1994 | 1359 | 91 | 62 |
| Example 18 | 10.3 | 0.26 | 19% | 2262 | 2036 | 1335 | 90 | 59 |
| Example 19 | 10.6 | 0.22 | 17% | 2332 | 2099 | 1283 | 90 | 55 |
| Comparative Example 7 | 10.9 | 0.18 | 14% | 2403 | 1970 | 649 | 82 | 27 |

Size AA alkali batteries (Examples, 15, 16, 17, 18, 19 and Comparative Examples 6 and 7) were manufactured in the same manner as Example 14 except that the weight of the anode mixture 2, i.e. the weight of the anode, was adjusted to 9.3 g, 9.6 g, 10.0 g, 10.3 g, 10.6 g, 8.7 g and 10.9 g as shown in Table 4.

Battery properties of these batteries were also measured in the same manner as Example 14.

Its results are listed in Table 4.

As shown in Table 4, in case of Comparative Example 6 exhibiting 0.52 as the ratio of the volume occupied by the noon-solid portion in the anode relative to the volume of the anode active material, which is beyond the range of the present invention, the discharge capacity of 1000 mA and the utilization factor are seriously low.

This occurred because contact points between solid particles, namely nickel oxyhydroxide grains and graphite grains decreased, and this caused a decrease of the electrical conductivity of the entire anode and hence a deterioration of the high-efficiency discharge property.

Also in Comparative Example 7 exhibiting 0.18 as the ratio of the volume occupied by the noon-solid portion in the anode relative to the volume of the anode active material, which is below the range of the present invention, the discharge capacity of 1000 mA and the utilization factor are seriously low.

This occurred because moisture in the electrolytic solution necessary for discharge reaction of nickel oxyhydroxide was locally insufficient, and this prevented the reaction and deteriorated he high-efficiency discharge property.

Moreover, in case of Comparative Example 6 in which the ratio of the volume occupied by the non-solid portion in the anode mixture was 32 volume % beyond the range of the present invention, discharge capacity of 150 mA and the utilization factor were seriously low.

This occurred because, due to a degradation of the molding strength of the anode packed in a metal can, the active material seriously dropped in the subsequent production process and lowered the discharge capacity.

Also in Comparative Example 7 in which the ratio of the volume occupied by the non-solid portion in the anode mixture was 14 volume % below the range of the present invention, the discharge capacity of 150 mA and the utilization factor were seriously low.

This occurred because, due to the likeliness of breakage and cracks in the anode packed in the metal can, the collecting performance of the entire anode deteriorated, and the discharge capacity was lowered.

Examples 20 Through 22 and Comparative Example 8

Size AA alkali batteries (Examples 20, 21, 22 and Comparative Example 8) were prepared in the same manner as Example 17 except that graphite powder was adjusted to 0 mass %, 2.7 mass %, 8.1 mass % and 10.8 mass % relative to 90 mass % of nickel oxyhydroxide powder and that the aqueous solution containing 40 mass % concentration of potassium hydroxide to be added was adjusted to 2.3 mass %, 3.5 mass %, 5.8 mass % and 6.9 mass %.

These batteries also underwent measurement of battery properties in the same manner as Example 14.

Its results are listed in Table 5.

TABLE 5

| | Composition ratio of anode active material (mass %) | Composition ratio of graphite (mass %) | Composition ratio of electrolytic solution (mass %) | Volume ratio of non-solid portion relative to anode active material | Volume ratio occupied by non-solid portion | Theoretic discharge capacity (mAh) | 150 mA discharge capacity (mAh) | 1000 mA discharge capacity (mAh) | 150 mA utilization factor (%) | 1000 mA utilization factor (%) |
|---|---|---|---|---|---|---|---|---|---|---|
| Example 20 | 98% | 0.0% | 2.3% | 0.30 | 23% | 2379 | 2117 | 1309 | 89 | 55 |
| Example 21 | 94% | 2.7% | 3.5% | 0.31 | 23% | 2285 | 2057 | 1348 | 90 | 59 |
| Example 17 | 90% | 5.4% | 4.6% | 0.31 | 22% | 2192 | 1994 | 1359 | 91 | 62 |
| Example 22 | 86% | 8.1% | 5.8% | 0.31 | 21% | 2098 | 1888 | 1259 | 90 | 60 |
| Comparative example 8 | 82% | 10.8% | 6.9% | 0.31 | 20% | 2004 | 1704 | 1022 | 85 | 51 |

As shown in Table 5, in case of Comparative Example 8 having the content of graphite larger than 10 mass % in the anode mixture, the discharge capacity of 150 mA and the utilization factor are decreased.

This occurred that, because of a decrease in quantity of the active material itself, the discharge capacity decreased, and carbonate ions generated by oxidation of graphite accelerated self-discharge and thereby caused a decrease of the discharge capacity.

Examples 23, 24 and Comparative Example 9

Size AA alkali batteries were prepared as Examples 23 and 24 in the same manner as Example 17 except coating nickel oxyhydroxide with metallic nickel and metallic cobalt, respectively, instead of coating it with cobalt oxyhydroxide. Another size AA alkali battery was prepared as Comparative Example 9 in the same manner as Example 17 except using nickel oxyhydroxide not coated instead of coating it with cobalt oxyhydroxide.

These batteries also underwent measurement of their battery properties in the same manner as Example 1.

Its results are shown in Table 6.

TABLE 6

| | Coating material | Volume ratio occupied by non-solid portion (volume %) | Theoretic discharge capacity (mAh) | 150 mA discharge capacity (mAh) | 1000 mA discharge capacity (mAh) | 150 mA utilization factor (%) | 1000 mA utilization factor (%) |
|---|---|---|---|---|---|---|---|
| Example 17 | Cobalt oxyhydroxide | 22% | 2192 | 1994 | 1359 | 91 | 62 |
| Example 23 | Metallic Ni | 22% | 2192 | 1972 | 1315 | 90 | 60 |
| Example 24 | Metallic Co | 22% | 2192 | 1929 | 1271 | 88 | 58 |
| Comparative Example 9 | No coating | 22% | 2192 | 1819 | 1140 | 83 | 52 |

As shown in Table 6, Examples 17, 23 and 24 in which nickel oxyhydroxide was coated with cobalt oxyhydroxide, metallic nickel and metallic cobalt, respectively, exhibited improved 150 mA and 1000 mA discharge capacities and utilization factors as compared with Comparative Example 9 with no coat.

This occurred that because surfaces of nickel oxyhydroxide were coated by the material having higher electrical conductivities, the electrical conductivity of the entire anode was enhanced, and the discharge capacity and the high-efficiency discharge property were improved.

Example 25

Preparation of the Anode 5.4 parts by mass of graphite powder are added to 90 parts by mass of nickel oxyhydroxide grains coated by high-order cobalt obtained by the above-explained means of preparing the anode active material (having the endothermic peak of 235° C. and the specific resistance of 10 Ω×cm), and they are stirred and mixed for 10 minutes.

After that, 4.6 parts by mass of a aqueous solution of 40 mass % of potassium hydroxide are added, and they are mixed in a universal mixer container for 30 minutes to obtain a mixture.

After that, this mixture is molded by compression molding into a hollow, cylindrical body having the outer diameter of 13.3 mm, inner diameter of 9.0 mm and height (length) of 13.7 mm.

Preparation of the Cathode 0.381 parts by mass of polyacrylic acid (gelling agent) are added to 64.58 parts by mass of zinc alloy powder containing 0.01 parts by mass of indium, 0.01 parts by mass of bismuth and 0.003 parts by mass of aluminum and having a mean grain size in the range from 100 to 300 μm, and they are stirred and mixed in a universal mixer container for five minutes to obtain a uniform mixed system.

On the other hand, 0.0006 parts by mass of tetrabutyl ammonium hydroxide are added to 35 parts b mass of aqueous solution of 35 mass % potassium hydroxide in which 3.5 mass % of zinc oxide is dissolved, and they are stirred and mixed for 10 minutes to disperse the latter sufficiently.

After that, that mixture of the zinc alloy powder system is gradually added to that dispersed system for four minutes, and they are stirred and mixed under a reduced pressure not higher than 200×10⁵ Pa (150 mmHg). They are further stirred and mixed under a reduced pressure not higher than 13.3×10⁵ Pa (10 mmHg) for five minutes, thereby to obtain a gel cathode of a uniform composition system.

Assemblage of the Battery

Next using the anode mixture pellet and the gel cathode heretofore prepared, a size AA nickel-zinc primary battery whose general configuration is illustrated in FIG. 1 in a cross-sectional view was assembled by a typical technique.

Examples 26 Through 32 and Comparative Examples 10 and 11

Size AA nickel-zinc primary batteries were prepared under the same conditions as those of Example 7 except the use of nickel oxyhydroxide coated with a high-order cobalt compound having the physical properties (endothermic peak temperature and specific resistance) as shown in Table 7.

Table 7 shows physical properties including those of Example 25.

TABLE 7

| Sample | Endothermic temperature peak (° C.) | Specific resistance (Ω×cm) | γnickel oxyhydroxide |
|---|---|---|---|
| Example 25 | 235 | 10 | Contained |
| Example 26 | 235 | 3 | Contained |
| Example 27 | 235 | 30 | Contained |
| Example 28 | 235 | 50 | Contained |
| Example 29 | 235 | 100 | Contained |
| Example 30 | 235 | 10 | Not contained |
| Example 31 | 200 | 90 | Contained |
| Example 32 | 260 | 30 | Contained |
| Comparative Example 10 | 280 | 30 | Contained |
| Comparative Example 11 | 180 | 15 | Contained |

For respective assembled nickel-zinc batteries, 150 mA or 1000 mA constant current discharge was carried out in an atmosphere of the temperature of 20° C. after aging of approximately 48 hours at the temperature of 25° C., and the utilization factors were evaluated from discharge capacities relative to theoretic capacities of the anode active materials. Its results are shown in Table 8.

TABLE 8

| Sample | Theoretic discharge capacity | 150 mA discharge capacity | 1000 mA discharge capacity | 150 mA utilization factor | 1000 mA utilization factor |
|---|---|---|---|---|---|
| Example 25 | 2200 | 1995 | 1380 | 91 | 63 |
| Example 26 | 2150 | 1962 | 1377 | 93 | 65 |
| Example 27 | 2105 | 1966 | 1288 | 91 | 60 |
| Example 28 | 2150 | 1933 | 1201 | 90 | 55 |
| Example 29 | 2150 | 1921 | 1103 | 89 | 51 |
| Example 30 | 2220 | 1998 | 1403 | 90 | 63 |
| Example 31 | 2150 | 1935 | 1118 | 90 | 52 |
| Example 32 | 2100 | 1911 | 1260 | 91 | 60 |

TABLE 8-continued

| Sample | Theoretic discharge capacity | 150 mA discharge capacity | 1000 mA discharge capacity | 150 mA utilization factor | 1000 mA utilization factor |
|---|---|---|---|---|---|
| Comparative Example 10 | 2150 | 508 | 210 | 23 | 4 |
| Comparative Example 11 | 2150 | 1570 | 855 | 73 | 40 |

As appreciated from Table 8, samples using the anode materials made of nickel oxyhydroxide coated by a high-order cobalt compound having the endothermic peak temperatures in differential thermal analysis in the range from 200 through 260° C. (Examples) exhibit larger discharge capacities than those of samples using nickel oxyhydroxide coated by a high-order cobalt compound having endothermic peak temperatures outside the range of 200 to 260° C. (Comparative Examples). Additionally, samples taken as Examples demonstrate the tendency that the high-efficiency discharge capacity decreases as the specific resistance increases.

As to the nickel-zinc primary batteries taken as Examples 25 and 30, the utilization factors when they are discharged by 150 mAh after exposed to the temperature of 60° C. for 20 hours are 95% of that of Example 30 when regarding Example 25 being 100%. This difference is assumed to have occurred because of suppression of self-discharge by the existence of γ-nickel oxyhydroxide.

Example 33

Preparation of the Anode 5.4 parts by mass of graphite powder having the specific surface area of 3.4 m$^2$/g and 0.1 parts by mass of polyethylene resin as a binder are added to 90 parts by mass of complex nickel hydroxide grains having a high-order cobalt layer formed on their surfaces, obtained by the above-explained means of preparing the anode active material, and they are stirred and mixed for 10 minutes.

After that, 4.6 parts by mass of aqueous solution of 40 mass % potassium hydroxide, and they are mixed for 30 minutes in a universal mixer container, thereby to obtain a mixture.

Subsequently, the mixture is molded by compression molding into a hollow, cylindrical body having the outer diameter of 13.3 mm, inner diameter of 9.0 mm and height (length) of 13.7 mm.

Preparation of the Cathode 0.381 parts by mass of polyacrylic acid (gelling agent) are added to 64.58 parts by mass of zinc alloy powder containing 0.01 parts by mass of indium, 0.01 parts by mass of bismuth and 0.003 parts by mass of aluminum and having a mean grain size in the range from 100 to 300 μm, and they are stirred and mixed in a universal mixer container for five minutes to obtain a uniform mixed system.

On the other hand, 0.0006 parts by mass of tetrabutyl ammonium hydroxide are added to 35 parts b mass of aqueous solution of 35 mass % potassium hydroxide in which 3.5 mass % of zinc oxide is dissolved, and they are stirred and mixed for 10 minutes to disperse the latter sufficiently.

After that, that mixture of the zinc alloy powder system is gradually added to that dispersed system for four minutes, and they are stirred and mixed under a reduced pressure not higher than 200×10$^5$ Pa (150 mmHg). They are further stirred and mixed under a reduced pressure not higher than 13.3×10$^5$ Pa (10 mmHg) for five minutes, thereby to obtain a gel cathode of a substantially uniform composition system.

Assemblage of the Battery

Next using the anode mixture pellet and the gel cathode heretofore prepared, a size AA nickel-zinc primary battery whose general configuration is illustrated in FIG. 1 in a cross-sectional view was assembled by a typical technique.

Examples 34 Through 39 and Comparative Examples 12 and 13

Size ASA alkali zinc primary batteries were prepared under the same conditions as those of Example 33 except the use of carbon grains having specific surface areas as shown in Table 9 as graphite grains contained in the anode mixture 2.

Table 9 shows those of Example 33 as well.

TABLE 9

| Sample | Specific surface area of carbon grain (m$^2$/g) | Content of carbon grains (mass %) |
|---|---|---|
| Comparative Example 12 | 0.9 | |
| Example 33 | 3.4 | 8.1 |
| Example 34 | 1.7 | 8.1 |
| Example 35 | 14 | 8.1 |
| Example 36 | 30 | 8.1 |
| Example 37 | 80 | 8.1 |
| Example 38 | 145 | 8.1 |
| Example 39 | 270 | 8.1 |
| Comparative Example 13 | 320 | 8.1 |

For respective assembled alkali zinc batteries, 150 mA or 1000 mA constant current discharge was carried out in an atmosphere of the temperature of 20° C. after aging of approximately 48 hours, and the utilization factors were evaluated from constant current discharge capacities relative to theoretic discharge capacities, respective constant current discharge capacities and theoretic discharge capacities of the anode active materials. Its results are shown in Table 10.

TABLE 10

| Sample | Theoretic discharge capacity (mAh) | 150 mA discharge capacity (mAh) | 1000 mA discharge (mAh) capacity | 150 mA utilization factor (%) | 1000 mA utilization factor (%) |
|---|---|---|---|---|---|
| Comparative Example 12 | 2126 | 1811 | 451 | 85.2 | 21.2 |
| Example 33 | 2126 | 1856 | 882 | 87.3 | 41.5 |
| Example 34 | 2126 | 1911 | 1118 | 89.9 | 52.6 |
| Example 35 | 2126 | 1960 | 1284 | 92.2 | 60.4 |
| Example 36 | 2126 | 1981 | 1341 | 93.2 | 63.1 |
| Example 37 | 2126 | 1945 | 1329 | 91.5 | 62.5 |
| Example 38 | 2126 | 1873 | 1269 | 88.1 | 59.7 |
| Example 39 | 2126 | 1684 | 1184 | 79.2 | 55.7 |
| Comparative Example 13 | 2126 | 1563 | 1063 | 73.5 | 50.2 |

As appreciated from Table 10, samples using anode mixtures containing carbon grains having specific surface areas in the range from 1.0 through 300 m$^2$/g (Examples) exhibit satisfactory discharge capacities and utilization factors for both 150 mA and 1000 mA.

In contrast, the sample of 0.9 m$^2$/g (Comparative Example 12) exhibits low 1000 mA discharge capacity and utilization factor.

A reason thereof is assumed to be that contact points between solid grains, namely, nickel oxyhydroxide grains and carbon grains, decrease, and this causes a decrease of the electrical conductivity of the entire anode and a deterioration of the high-efficiency discharge property.

On the other hand, the sample containing carbon grains having the specific surface area of 320 m²/g in the anode mixture (Comparative Example 2) exhibits low 150 mA discharge capacity and utilization factor.

A reason thereof is assumed to be that oxidizing reaction of carbon grains is accelerated, and carbonate ions generated by the oxidation accelerate self-discharge, thereby to decrease the discharge capacity.

Examples 40 Through 42 and Comparative Examples 14 and 15

Size AA alkali zinc primary batteries were prepared under the same conditions as those of Example 33 except that the composition ratio (mass %) of graphite grains used as carbon grains contained in the anode mixture 2 and having the specific surface area of 30 m²/g were adjusted as shown in Table 11.

TABLE 11

| Sample | Specific surface area of carbon grain (m²/g) | Content of carbon grains (mass %) |
| --- | --- | --- |
| Comparative Example 14 | 30 | 2.7 |
| Example 40 | 30 | 5.4 |
| Example 36 | 30 | 8.1 |
| Example 41 | 30 | 10.8 |
| Example 42 | 30 | 13.5 |
| Comparative Example 15 | 30 | 16.2 |

For respective assembled alkali zinc batteries, 150 mA or 1000 mA constant current discharge was carried out in an atmosphere of the temperature of 20° C. after aging of approximately 48 hours, and the utilization factors were evaluated from constant current discharge capacities relative to theoretic discharge capacities, respective constant current discharge capacities and theoretic discharge capacities of the anode active materials. Its results are shown in Table 12.

TABLE 12

| Sample | Theoretic discharge capacity (mAh) | 150 mA discharge capacity (mAh) | 1000 mA discharge (mAh) capacity | 150 mA utilization factor (%) | 1000 mA utilization factor (%) |
| --- | --- | --- | --- | --- | --- |
| Comparative Example 14 | 2257 | 1607 | 479 | 71.2 | 21.2 |
| Example 40 | 2192 | 1913 | 1116 | 87.3 | 50.9 |
| Example 36 | 2126 | 1981 | 1341 | 93.2 | 63.1 |
| Example 41 | 2060 | 1920 | 1218 | 93.2 | 59.1 |
| Example 42 | 1994 | 1861 | 1067 | 93.3 | 53.5 |
| Comparative Example 15 | 1929 | 1759 | 753 | 91.2 | 39.3 |

As appreciated from Table 12, the sample using the anode mixture 2 containing 2.7 mass % of carbon grains (Comparative Example 14) exhibits lower discharge capacities and lower utilization factors both for 150 mA and 1000 mA than those of the samples using anode mixtures containing carbon grains in the range from 3 to 15 mass %.

A reason thereof is assumed to be that a shortage occurred in the amount of carbon grains necessary for current collection of nickel oxyhydroxide grains, and it invited a decrease of the utilization factor.

The sample using the anode mixture 2 containing carbon grains exceeding 15 mass % (Comparative Example 15) exhibits a low discharge capacity and a low utilization factor for 15 mA.

A reason thereof is assumed to be that a decrease of the packed quantity of nickel oxyhydroxide grains causes a decrease of the discharge capacity, and carbonate ions generated by oxidation of graphite accelerates self-discharge and decreases the discharge capacity.

Examples 43 Through 49

Size AA alkali zinc primary batteries were prepared under the same conditions as those of Example 33 except that carbon grains contained in the anode mixtures 2 are those of mixed systems containing graphite grains having the specific surface area of 14 m²/g and graphite grains having the specific surface area Table 11 and that the composition ratios of these mixed systems are adjusted to 8.1 mass %.

Table 13 shows values of Examples 35 and 39 as well.

TABLE 13

| Sample | Composition ratio of graphite grains with specific surface area of 14 m²/g (mass %) | Composition ratio of graphite grains with with specific surface surface area of 270 m²/g (mass %) | Content of graphite grains (mass %) |
| --- | --- | --- | --- |
| Example 35 | 100 | 0 | 8.1 |
| Example 43 | 80 | 20 | 8.1 |
| Example 44 | 70 | 30 | 8.1 |
| Example 45 | 60 | 40 | 8.1 |
| Example 46 | 50 | 50 | 8.1 |
| Example 47 | 40 | 60 | 8.1 |
| Example 48 | 30 | 70 | 8.1 |
| Example 49 | 20 | 80 | 8.1 |
| Example 39 | 100 | 0 | 8.1 |

As to respective assembled alkali zinc primary batteries, 150 mA or 1000 mA constant current discharge was carried out in an atmosphere of 20° C. after aging of approximately 48 hours, and the utilization factors were evaluated from constant current discharge capacities relative to theoretic discharge capacities, respective constant current discharge capacities and theoretic discharge capacities of the anode active materials. Its results are shown in Table 14.

TABLE 14

| Sample | Theoretic discharge capacity (mAh) | 150 mA discharge capacity (mAh) | 1000 mA discharge (mAh) capacity | 150 mA utilization factor (%) | 1000 mA utilization factor (%) |
| --- | --- | --- | --- | --- | --- |
| Example 35 | 2126 | 1960 | 1284 | 92.2 | 60.4 |
| Example 43 | 2126 | 1977 | 1329 | 93.0 | 62.5 |
| Example 44 | 2126 | 2011 | 1367 | 94.6 | 64.3 |
| Example 45 | 2126 | 2037 | 1426 | 95.8 | 67.1 |
| Example 46 | 2126 | 2049 | 1475 | 96.4 | 69.4 |
| Example 47 | 2126 | 2026 | 1465 | 95.3 | 68.9 |
| Example 48 | 2126 | 1983 | 1416 | 93.3 | 66.6 |
| Example 49 | 2126 | 1892 | 1341 | 89.0 | 63.2 |
| Example 39 | 2126 | 1684 | 1184 | 79.2 | 55.7 |

As appreciated from Table 14, 150 mA and 1000 mA discharge capacities and utilization factors vary with composition ratio between carbon grains having the specific surface area of 14 m²/g and graphite grains having the specific surface area of 270 m²/g in the carbon grains contained in the anode mixture.

That is, in the samples in which almost all of carbon grains are those having the specific surface area of 14 $m^2/g$ (Examples 35 and 43), it is assumed that, because of a small amount of carbon grains having small grain sizes, a shortage occurs in quantity of carbon grains surrounding the anode active material grains, and degrades the current collection efficiency from the anode active material grains.

In contrast, in the samples in which almost all of carbon grains are those having the specific surface area of 270 $m^2/g$ (Examples 39 and 49), both 150 mA and 1000 mA discharge capacities and utilization factors are low.

Presumably, its reason lies in that carbonate ions generated by oxidation of graphite accelerate self-discharge, and decreases the discharge capacity.

Example 50

Using nickel oxyhydroxide powder after coating processing with 5 mass % of cobalt oxyhydroxide as the active material, graphite powder was added and stirred for five minutes in a universal agitation mixer.

The ratio of graphite added was 5%.

5 parts by mass of aqueous solution containing 40 mass % concentration of potassium hydroxide were added to 100 parts by mass of the mixed powder thus obtained, and they were stirred by wet agitation for five minutes in a universal mixer.

After that, the mixture obtained was compressed into a plate of a thickness not larger than 1 mm with a roller press.

Subsequently, the plate-like compressed mixture was crushed with a crusher, and by classifying the grains with an automatic sifter of 22 through 100 meshes, thereby to obtain granular mixture having grain sizes from 150 to 710 μm.

After that, zinc stearate powder was added to the granular mixture thus obtained, and they were stirred to obtain a granular mixture containing zinc stearate powder adhered onto grain surfaces.

Quantity of the zinc stearate powder added was 0.1 mass % relative to the weight of the granular mixture.

Example 51

A granular mixture was prepared in the same manner as Example 1 except the use of calcium stearate powder instead of zinc stearate powder as the stearic acid compound.

Example 52

A granular mixture was prepared in the same manner as Example 50 except the use of nickel oxyhydroxide powder after coating processing by 5 mass % of metallic nickel instead of nickel oxyhydroxide powder after coating processing by 5 mass % of cobalt oxyhydroxide as the anode active material.

Example 53

A granular mixture was prepared in the same manner as Example 50 except the use of nickel oxyhydroxide powder after coating processing by 5 mass % of metallic cobalt instead of nickel oxyhydroxide powder after coating processing by 5 mass % of cobalt oxyhydroxide as the anode active material.

Comparative Example 16

A granular mixture was made in the same manner as Example 50 except that zinc stearate powder was not added.

(Fabrication of the Battery)

Those five kinds of granular mixtures obtained as explained above were molded by compression molding into hollow, cylindrical bodies of the size for JIS standard LR6 type (size AA) by using a tableting machine.

The molding density employed was 3.20 $g/cm^3$.

For the purpose of comparing separability from the mold in the process of compression molding of three kinds of granular mixtures into hollow, cylindrical bodies having the molding density of 3.20 $g/cm^3$, conditions about squeak by friction are shown in Table 15.

TABLE 15

| Example and Comparative Example | Squeak |
|---|---|
| Example 50 | No squeak |
| Example 51 | No squeak |
| Example 52 | No squeak |
| Example 53 | No squeak |
| Comparative Example 16 | Considerably large squeak |

According to the result of Table 15, Comparative Example 16 using no stearic acid compound generates squeak upon compression molding of the hollow, cylindrical body of a level making mass production difficult. Examples 50 through 53 using the stearic acid compound exhibit certain effects by lubricity of the stearic acid compound.

Even in case of Comparative Examples not using the stearic acid compound, squeak can be removed by increasing the ratio of graphite added to approximately 10%. Nevertheless, taking account of electric capacity after the battery is finally assembled, Comparative Examples are disadvantageous as compared with Examples 50 though 53.

Subsequently, in order to compare the moldability of the molds of those five kinds of granular mixtures in form of hollow, cylindrical bodies having the molding density of 3.20 $g/cm^3$, anti-collapse strength of each mold was measured by using Rheometer CRX200D made by the manufacturer, San Kagaku (n=100).

Results of the measurement are shown in Table 16 (average value of n–100).

TABLE 16

| Example and Comparative Example | Anti-collapse strength (N) |
|---|---|
| Example 50 | 7.49 |
| Example 51 | 7.45 |
| Example 52 | 7.43 |
| Example 53 | 7.40 |
| Comparative Example 16 | 4.88 |

As shown in Table 16, Examples 50 through 53 resulted in having the strength approximately 1.5 times of such strength of Comparative Example 16 not using the stearic acid compound.

Presumably, the stearic acid compound added to adhere on surfaces of grains improved the fluidity and lubricity of the granular mixture in the mold and enabled a mold substantially uniform in molding density to be molded.

Even in case of the Comparative Example not using the stearic acid compound, anti-collapse strength of the mold can be improved by increasing the ratio of graphite added to approximately 10%. Nevertheless, taking account of electric capacity after the battery is finally assembled, the Comparative Example is disadvantageous as compared with Examples 50 though 53.

For the purpose of comparing the life time of the mold for molding five kinds of granular mixtures by compression molding into hollow, cylindrical bodies having the molding density of 3.20 g/cm$^3$, Table 17 shows changes of the inner diameter of the mold (material: SKDX11, whole hardening HRC60) by abrasion after being used for approximately 1000 hours under the same condition.

TABLE 17

| Example and Comparative Example | Change of the inner diameter |
|---|---|
| Example 50 | 0.197% |
| Example 51 | 0.202% |
| Example 52 | 0.206% |
| Example 53 | 0.201% |
| Comparative Example 16 | 0.409% |

As appreciated from the results of Table 17, changes of the inner diameter of the mold approximately correlate with the squeak, and Examples 50 through 53 were improved in lubricity of the granular mixture by adding the stearic acid compound to adhere on grain surfaces, and the stearic acid compound is believed to be useful especially for alleviating friction upon removing (pushing out) the molded body from the mold.

As shown above, in these Examples and Comparative Example, the invention was applied to JIS standard LR type (size AA) batteries, and nickel-zinc primary batteries of the same size were prepared.

Although such batteries could be made with the anode molding mixtures used in the Examples, some of Comparative Examples could not make up batteries because they broke, cracked or chipped upon compressive packing thereof into anode cases.

Although the invention employs production methods of previously making a granular mixture and thereafter coat the grain surfaces with a stearic acid compound, the invention may also employ other methods of adding a stearic acid compound simultaneously with dry agitation of the anode active material and graphite powder to mix and stir them.

However, the latter methods are more difficult to bring about the effect than the former methods because of a lower concentration of the stearic acid compound on grain surfaces, and the former methods are more excellent.

Example 54 and Comparative Example 17

Oxidation is promoted by adding sodium hypochlorite to 100 parts by mass of nickel hydroxide grains, thereby to obtain nickel oxyhydroxide.

The products thus obtained were confirmed to be complex nickel oxyhydroxide grains by XRD identification and by confirming through back titration of ammonium ferrous sulfate/potassium permanganate that almost all quantity of Ni has become trivalent.

0.5 parts by mass o $Y_2O_3$ were added to 100 parts by mass of that nickel oxyhydroxide, thereby to obtain the anode active material.

By adding carbon and an electrolytic solution to the anode active material and molding them, a anode mixture was prepared.

Respective components of the anode mixture were mixed and molded by the following mass ratio, taking account of the molding strength, etc. of the anode mixture.

Nickel oxyhydroxide:Carbon:Electrolytic solution=100:6:5

In this case, the molding density was 3.22 g/cm$^3$.

For the cathode, a cathode mixture was prepared by using anhydrous silver or lead-free zinc alloy used in known manganese dioxide-zinc primary batteries. Composition of zinc gel of the cathode mixture was determined as follows.

Zinc:Water-absorbing binder:12N KOH=100:1.5:55

Here again, density of the zinc gel was 2.70 g/cm$^3$.

As the electrolytic solution, a aqueous solution mixing 12N KOH and 1N LiOH was used.

While measuring and adjusting materials in mass so as to adjust the anode theoretic capacity to 240 mAh, the cathode theoretic capacity to 2640 mAh (negative/anode capacity ratio=1.1) and the ratio of the electrolytic solution relative to the anode theoretic capacity to 1.2 ml/Ah, the anode mixture and the cathode gel obtained by the above-explained methods are packed in a size AA, inside-out type anode can shown in FIG. 1, and 18 batteries were assembled.

These batteries were divided to six groups each including three batteries, and batteries of respective groups were put in constant-temperature tanks maintained at 10, 20, 30, 40, 60 and 80° C., respectively, and OCV measurement was periodically measured at the normal temperature to evaluate changes of OCV with storage days. Its results are shown in FIG. 3.

Figure 3:
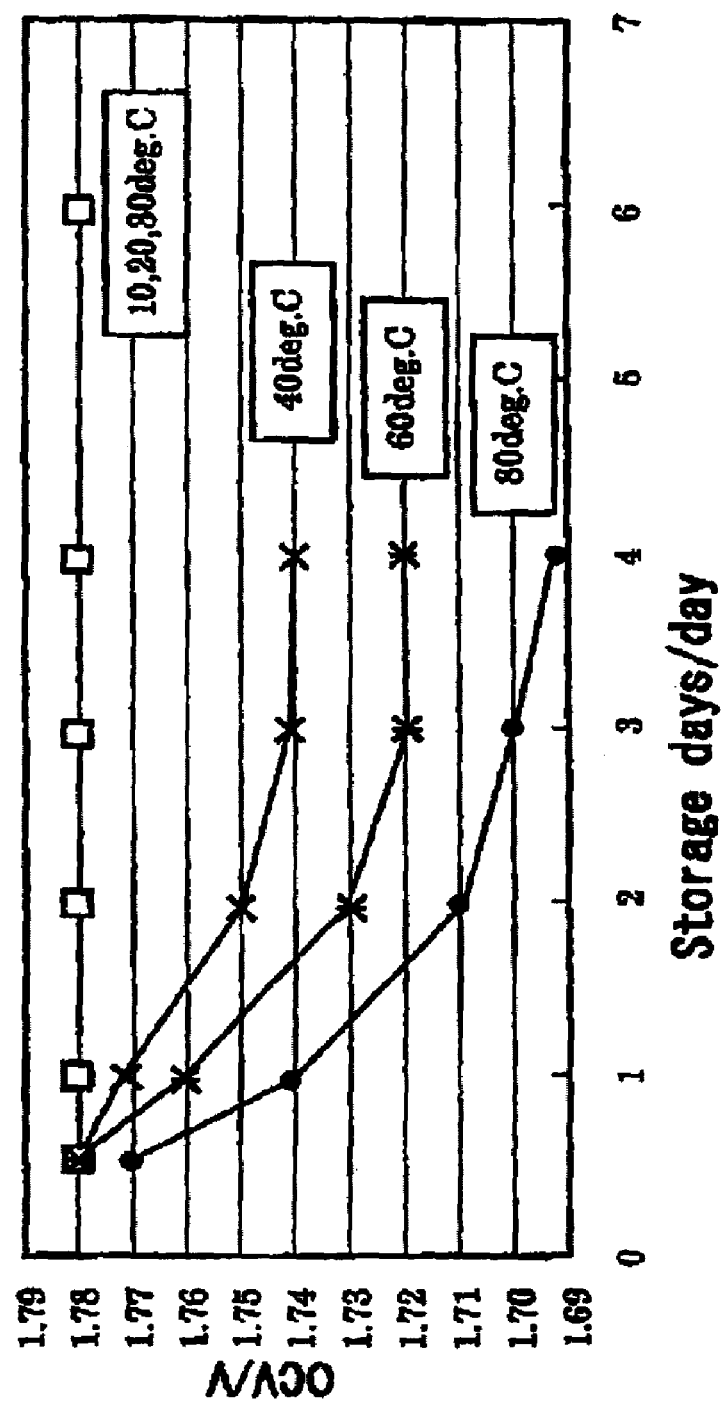
FIG. 3 is a graph that shows an effect of the invention.

It is appreciated from FIG. 3 that effects of OCV adjustment by high-temperature aging can be confirmed only in the range of (θ:t)=(40-80:24-27) where θ is the temperature and t is the time. Although OCV adjustment is possible also by aging in a 100° C. constant-temperature tank, this is the temperature that boils water and impractical from the viewpoint of operating the system.

As explained above in detail, the invention employs high-temperature aging as the method of bringing about self-discharge of a battery with a high OCV (open circuit voltage) to make it compatible with other batteries. This is because batteries are normally shipped approximately one month later than fabrication thereof, and self-discharge in the storage period is small and insufficient for OCV adjustment. Thus the batteries are forcibly subjected to self-discharge at a high-temperature.

Therefore, in a business condition where batteries are shipped approximately half a year later than fabrication thereof, OCV will naturally decrease to an appropriate range by self-discharge without the need of forcibly carrying out self-discharge.

The use of self-discharge phenomenon of batteries in such cases does not depart from the concept of the invention to bring batteries into compatibility with other batteries having different OCV.

Example 55

The anode active material used in this Example was prepared in the following manner.

First prepared are 100 parts by mass of nickel hydroxide grains doped with zinc and cobalt, and 7 parts by mass of cobalt hydroxide grains are added. After that, while they are stirred in an atmospheric environment, 11 parts by mass of sodium hydroxide aqueous solution are sprayed, and the mixture is subsequently heated by microwaves, thereby to obtain complex nickel hydroxide having a cobalt high-order oxide layer on surfaces of nickel hydroxide.

After that, by adding an oxidizing agent such as sodium hypochlorite to that system to promote oxidation, complex nickel oxyhydroxide coated by a cobalt high-order oxide can be obtained.

The product obtained was confirmed to be complex nickel hydroxide grains by XRD identification.

Additionally, the ratio of trivalent in whole Ni was evaluated by back titration of ammonium ferrous sulfate/ potassium permanganate, and this was defined as the oxidation ratio.

The oxidation ratio then obtained was 100%, and all nickel atoms were trivalent.

Using this anode active material, after storing it for arbitrary days in an atmosphere fixed in relative humidity to 80% and controlled in temperature to 10, 30, 50 and 60° C., it was taken out and underwent the same measurement of oxidation ratio.

Figure 4:
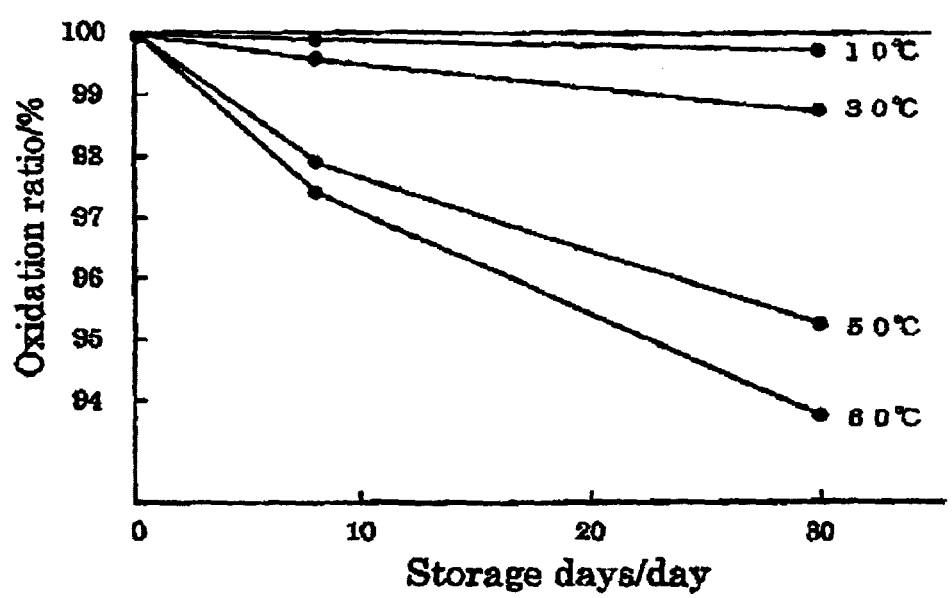
FIG. 4 is a graph that shows an effect of the invention.

Its results are shown in FIG. 4.

It has been confirmed from FIG. 4 that a difference is produced in changes of oxidation ratio with time even in an atmosphere having relative humidity as high as 80%, if the temperature is controlled.

That is, it has been confirmed that deterioration of nickel high-order oxides by deoxidization can be efficiently prevented by keeping the temperature not higher than 30° C.

Although not definite, a reason thereof is assumed to be that nickel high-order oxides controlled in temperature limit the quantity of saturation vapor under the atmosphere, in other words, that the absolute humidity is controlled and kinetic energy o water molecules can be limited.

Regarding self-discharge of the positive ole material during its storage, when taking account of the number of water molecules around the anode active material grains and the degree of their collision, it will be very effective for preventing deterioration of the nickel high-order oxide to decrease collision of water molecules against the anode active material by decreasing he temperature, decreasing the quantity of saturation vapor in that atmosphere, that is, by decreasing the number of water molecules and decreasing the kinetic energy of the water molecules.

In the present invention, storage experiments were carried out by assuming that the lead time until assembling the batteries is 30 days. However, the invention is not necessarily limited to it.

Also, the active material is not limited to complex nickel oxyhydroxide.

This is the case also regarding the production method. That is, the same effects will be obtained even with nickel oxyhydroxide obtained by using an arbitrary oxidizing agent.

By adding carbon and an electrolytic solution to the anode active material obtained by the above-explained method and by molding it, the anode mixture was prepared. Respective components of the anode mixture were combined by the following weight ratio, taking the molding strength, etc. of the anode mixture into consideration.

Complex nickel oxyhydroxide:carbon:12N KOH=100: 6:5

The density of the mold obtained here was approximately 3.22 g/cm³.

For the cathode, a cathode mixture was prepared by using anhydrous silver or lead-free zinc alloy used in known manganese dioxide-zinc primary batteries.

Composition of zinc gel of the cathode mixture was determined as follows.

Zinc:Water-absorbing binder:12N KOH=100:1.5:55

Density of the zinc gel then obtained was approximately 2.70 g/cm³.

As the electrolytic solution, a 12N KOH aqueous solution was used.

The anode mixture and the cathode gel thus obtained were packed into a can while measuring their masses, and an electrolytic solution is poured by the ratio of 1.3 ml/Ah relative to the theoretic capacity of the anode. Then, the can opening was sealed with a seal member incorporating a metal plate/cathode top having a collector/gas release vent, thereby to obtain the AA size nickel-zinc primary battery shown in FIG. 1.

After the completed batteries were exposed to an atmosphere of 20° C. for three days to render them active, constant current discharge of 150 mA 1.0V cut-off was carried out in an atmosphere of 20° C., thereby to measure the discharge capacity.

As a result, a linearity has been confirmed to exist between the oxidation ratio of the anode active material obtained here and the discharge capacity of a enclosed nickel-zinc primary battery assembled by using it.

That is, when the same amount of active material is packed, it has been confirmed that those maintaining a high oxidation ratio provide a high discharge capacity whereas those changed to a low oxidation ratio provide a low discharge capacity.

Although detailed explanation is not made here about relations between the humidity and the storage period, it will be readily understood that self-discharge of he anode active material can be further suppressed by controlling the humidity in addition to the temperature.

Example 56

Figure 5:
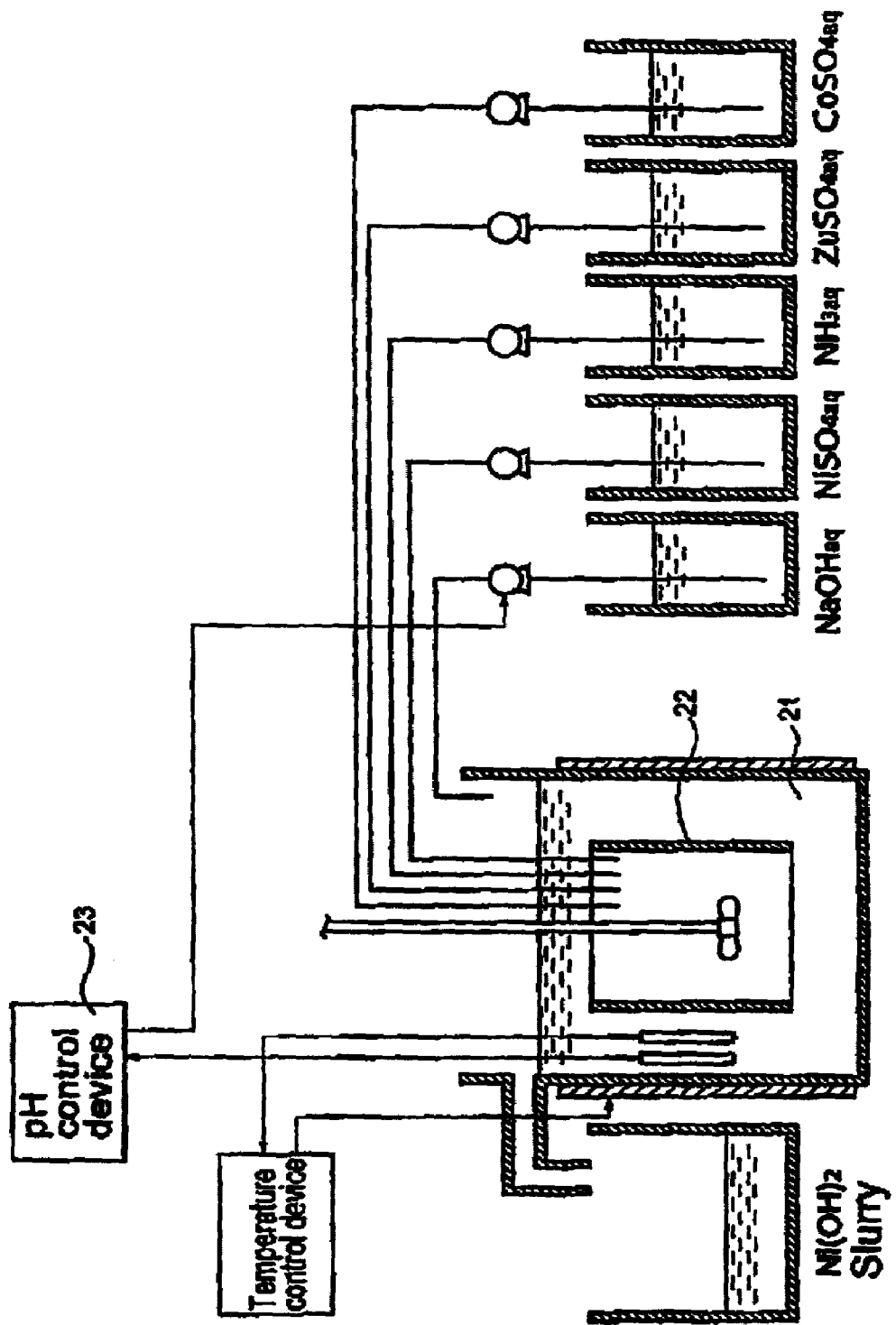
FIG. 5 is a schematic diagram of an apparatus for production ball-shaped nickel hydroxide grains suitable for the anode active material in the present invention.

Using the apparatus of FIG. 5, eutectic ball-shaped nickel hydroxide containing 5% Zn and 1% Co in a eutectic form was first prepared.

The reaction vessel 21 is equipped with a tube 22 for separating core generating portions and crystal growth portions. While supplying 8 volume % of 25% ammonium aqueous solution to 2M nickel sulfate aqueous solution, 0.158M zinc sulfate aqueous solution and 0.035M cobalt sulfate aqueous solution, and while controlling pH to approximately 11.5 through 11.9 with a pH controller 23, 6.5M sodium hydroxide solution was continuously supplied, and after being stabilized by the residence time of one day, slurry was extracted by an overflow technique.

In this process, the temperature was maintained at 37° C.

The slurry obtained was repetitively dewatered and washed, and when pH of the washing water became 7 through 8, it was finally dewatered and dried.

Grains thus obtained were confirmed to be eutectic nickel hydroxide of 5% Zn and 1% Co by confirming by powder X-ray analysis that the crystals were nickel hydroxide (here was confirmed that Zn and Co peaks did not appear) and by confirming that 5% Zn and 1% Co are contained in the nickel hydroxide in a eutectic form by dissolving the powder in hydrochloric acid and quantitatively determining it by atomic absorption.

Subsequently, after adding 7 parts by mass of $Co(OH)_2$ to 100 parts by mass of nickel hydroxide grains containing 5% Zn and 1% Co in a eutectic form, while stirring them and spraying 15 parts by mass of 10N NaOH, heating by microwaves was carried out to obtain complex nickel hydroxide grains including cobalt high-order oxide on their surfaces, and sodium hypochlorite was further added to the system to promote oxidation. Finally, the mixture was washed and dried, thereby to obtain complex nickel oxyhydroxide including a cobalt high-order oxide.

The product obtained was confirmed to be complex nickel oxyhydroxide grains by XRD identification and by confirming by back titration of ammonium ferrous sulfate/potassium permanganate that almost all quantity of Ni had become trivalent.

Additionally, the Ni purity of the complex nickel oxyhydroxide at that time was measured by EDTA titration or ICP analysis, and was evaluated to be 54%.

It was also confirmed by a laser technique that grain size distribution of complex nickel oxyhydroxide at that time drew a curve having the $D_{50}$ value of 10 µm and approximated to a regular distribution ranging from 1 to 20 µm.

Furthermore, the grains were confirmed to be an aggregation of ball-shaped grains and approximately ball-shaped grains by using a scanning electron microscope.

Graphite and an electrolytic solution were added to the anode active material obtained by the above-explained method, and through roller compaction processing using a roller compactor (WP230x80 manufactured by Turbo Kogyo) under a wire pressure in the range from $0.49 \times 10^4$ through $4.48 \times 10^4$ N/cm and appropriate granulation processing using a granulator (GRN-T-54S manufactured by Nippon Granulator), anode mixture grains ware prepared.

The first yield of grain size classification in the range from 200 to 800 µm in this process is shown in Table 18.

In general, granulation is carried out in a system configured to return a part of powder granulated too finely to the roller compactor return a part of powder too coarse to a granulator. However, when the first yield is high, it contributes to decreasing damage to the active material by compression and friction. Therefore, this is a very important technique.

TABLE 18

| Molding stress (×10⁴ N/cm) | Primary granulation yield (%) |
|---|---|
| 0.49 | 45 |
| 0.99 | 50 |
| 1.51 | 55 |
| 2.02 | 58 |
| 2.51 | 61 |
| 2.99 | 63 |
| 3.48 | 64 |
| 3.97 | 64 |
| 4.48 | 64 |

It is appreciated from Table 18 that the molding stress by the roller compactor is preferably not smaller than $1.5 \times 10^4$ N/cm.

In this experiment, the limit of the molding pressure was $4.48 \times 10^4$ N/cm, and under pressures beyond it, a torque limiter acted and disabled preparation of compressed powder.

Taking account of the durability of the roller compactor as well, the range from $1.5 \times 10^4$ to $3.5 \times 10^4$ N/cm is appropriate.

After that, granulated powder in the range from 200 to 800 µm obtained by the molding pressure in the range from $1.51 \times 10^4$ to $3.48 \times 10^4$ N/cm of the roller compactor was packed in a size AA mold, and molded by arbitrary pressures, thereby to obtain positive mixture grains having various molding densities.

Respective components of the anode mixture are mixed by the following weight ratios, taking the molding strength, etc. of the anode mixture into account.

Complex nickel oxyhydroxide:Carbon:12N KOH=100:6:5

For the cathode, a cathode mixture was prepared by using anhydrous silver and lead-free zinc alloy used for known manganese dioxide-zinc primary batteries.

The following composition was used as the zinc gel composition of the cathode mixture.

Zinc:Water-absorbing binder:12N KOH=100:1.5:55

The zinc gel density then obtained was 2.70 g/cm³.

Used as the electrolytic solution was a 12N KOH solution in which ZnO was dissolved to the saturation point.

Using various kinds of anode mixtures thus obtained, so as to ensure that the anode becomes the capacity regulating pole, a capacitively larger amount of the cathode gel was introduced into a can by a given measured mass, and the can opening was sealed by crimping with a seal member incorporating a metal plate/cathode top having a collector/gas release vent, thereby to obtain the size AA nickel-zinc primary battery shown in FIG. 1.

Discharge capacities and anode utilization factors upon 100 mA/0.8 Vcut discharge at 20° C. relative to the molding density of the anode mixture at that time are shown in Table 19.

It is appreciated from Table 19 that favorable anode molding densities range from 2.7 to 3.5 g/cm³.

TABLE 19

| Molding density (g/cm³) | Discharge capacity (mAh) | Anode utilization factor (%) |
|---|---|---|
| 2.45 | 1349 | 80 |
| 2.72 | 1647 | 88 |
| 3.04 | 1925 | 92 |
| 3.25 | 2058 | 92 |
| 3.52 | 2180 | 90 |
| 3.82 | 2077 | 79 |

Comparative Example 18

Another battery as Comparative Example 18 was prepared by the following method.

The battery as the Comparative Example basically has the same configuration except the anode active material used in the Examples.

The anode active material employed here used, as its base, nickel hydroxide grains obtained by simply mixing sodium hydroxide solution to nickel sulfate solution.

This is a conventionally used method of preparing nickel hydroxide.

That is, this method does not include either strict pH control by using ammonium aqueous solution or constant stirring during chemical reaction.

Further, the method does not carry out eutectic addition of zinc or cobalt inside either.

Furthermore, the method does not carry out coating by a cobalt compound outside either.

A lump of nickel hydroxide thus obtained was once introduced into a known crusher, and crushed into grains of a grain size distribution approximately the same as that of electrolytic manganese dioxide grains used in typical alkali manganese primary batteries ($MnO_2$-Zn primary batteries).

That is, the grain were sized such that the $D_{50}$ value by the laser technique became 40 through 50 µm, and had grain sizes ranging from 1 to 120 µm.

Further, the grains thus obtained were oxidized by sodium hypochlorite into nickel oxyhydroxide grains in the same manner as the Examples.

They are next washed and dried, and finally, a light stress was added to them to adjust the grain sizes to a distribution approximately equal to that before oxidation.

These grains were confirmed to be nickel oxyhydroxide grains similarly by XRD identification and by confirming by back titration of ammonium ferrous sulfate/potassium permanganate that substantially all quantity of Ni had become trivalent.

Additionally, the Ni purity of the nickel oxyhydroxide at that time was measured by EDTA titration, and evaluated to be 60%.

Furthermore, it was confirmed through a scanning electron microscope that the grains had irregular forms.

Using the anode mixture thus obtained, a anode mixture of the same composition as that of the Examples was prepared and underwent roller compaction processing by the molding stress in the range from $0.51 \times 10^4$ to $3.49 \times 10^4$ N/cm (WP230x80 manufactured by Turbo Kogyo) and adequate granulation processing (GRN-T-54S manufactured by Nippon Granulator), thereby to obtain a granular anode mixture.

The first yield of grain size classification in the range from 200 to 800 µm in this process is shown in Table 20.

TABLE 20

| Molding stress ($\times 10^4$ N/cm) | Primary granulation yield (%) |
|---|---|
| 0.51 | 27 |
| 1.02 | 33 |
| 1.52 | 37 |
| 2.01 | 41 |
| 2.52 | 44 |
| 3.03 | 44 |
| 3.49 | 44 |

It is appreciated from Table 20 that the molding stress promising a high granulation yield in this system is in the range from $1.5 \times 10^4$ to $2.5 \times 10^4$ N/cm; nevertheless, the granulation yield is low in any of the versions as compared with Table 18 of Example 56. Thus the Examples are confirmed to be superior.

Especially when it is compared with the yield under a molding stress in the preferable range from $1.5 \times 10^4$ to $3.5 \times 10^4$ N/cm among Examples, the yield of the Example is confirmed to be higher as much as approximately 20%.

Presumably, its reason lies in that, because the nickel oxyhydroxide grains are ball-shaped grains, substantially ball-shaped grains or their combination, stress concentration is alleviated upon roller compaction, and this contributes to uniform compression and close packing of grains, and hence ensures an adequate strength against later granulation by the granulator.

In this experiment, the limit of the molding pressure was $3.49 \times 10^4$ N/cm, and under molding pressures beyond it, a torque limiter acted and disabled preparation of compressed powder.

Its reason can be assumed to lie in that conventional nickel oxyhydroxide grains are irregular in shape and stress concentration occurs upon roller compaction.

After that, by using granulated powder of 200 to 800 µm obtained under a molding pressure (through the granulator) in the range from $1.52 \times 10^4$ to $2.52 \times 10^4$ N/cm, which was better among Comparative Examples, and by packing the granulated powder in a size AA mold and then molding it with arbitrary pressures, anode mixture molds having various kinds of molding densities were obtained.

Then, using these anode mixture molds and combining the same zinc gel, the same saturated ZnO-contained electrolytic solution, etc. as those of Example 56, size AA nickel-zinc primary batteries of the same configuration were prepared.

Discharge capacities and anode utilization factors upon 100 mA/0.8 Vcut discharge at 20° C. relative to the anode molding density at that time are shown in Table 21.

TABLE 21

| Molding density (g/cm$^3$) | Discharge capacity (mAh) | Anode utilization factor (%) |
|---|---|---|
| 2.11 | 886 | 61 |
| 2.32 | 1134 | 71 |
| 2.51 | 1278 | 74 |
| 2.89 | 1392 | 70 |

It is appreciated from Table 21 that the molding density promising a high granulation yield in this system is in the range from 2.32 to 2.89 g/cm$^3$; nevertheless, the granulation yield is low in any of the versions as compared with Table 19 of the Examples (excluding the molding density of 2.45 g/cm$^3$). Thus the Examples are confirmed to be superior.

Especially when it is compared with the yield under a molding density in the preferable range from 2.7 to 3.5 g/cm$^3$ among Examples, the yield of the Example is confirmed to be higher as much as approximately 20 to 250%.

Presumably, its reason lies in the large differences not only in molding density but alto in utilization factor by the use of ball-shaped grains, substantially ball-shaped grains or their combination as the nickel oxyhydroxide grains.

A reason why a high utilization factor is obtained by using nickel oxyhydroxide grains of Example 56 is assumed to lie in alleviation of damage to the active material upon roller compaction, readiness for compact packing because of the spherical shape of the grains, and sufficient and reliable contact between grains.

It might be another reason thereof that nickel oxyhydroxide contains zinc and cobalt inside in a eutectic form and is therefore stable in crystallographic structure.

Furthermore, a battery made by using a anode mold having the molding density of 3.25 g/cm$^3$ providing the highest anode utilization factor among Examples 56 and a battery made by using a anode mold having the molding density of 2.52 g/cm$^3$ providing the highest positive utilization factor among Comparative Examples 18 were prepared, and they were exposed to an atmosphere of 60° C. for 20 days. Thereafter, by returning the temperature to 20° C., and carrying out 100 mA/0.8 Vcut discharge, their anode utilization factors were calculated, and determining their anode utilization factors initially obtained under the same conditions (that is, the positive utilization factor 91% of the battery using the anode mold of 3.25 g/cm$^3$ in Table 19 and the anode utilization factor 65% of the battery using the anode mold of 2.51 g/cm$^3$ in Table 21) to be 100%, respectively, relative utilization factors were evaluated. They are shown as capacity holding coefficients in Table 22.

TABLE 22

| Type of battery | Capacity holding coefficient (%) |
| --- | --- |
| Example 56 | 70 |
| Comparative Example 18 | 58 |

From Table 22, superiority of Example 56 to Comparative Example 18 is confirmed in terms of capacity holding coefficient.

Its reason is considered to lie in that, because the nickel oxyhydroxide grains of the Example contained zinc and cobalt in a eutectic form, its oxygen overvoltage was large, and suppresses self-discharge.

Another reason may be that the nickel oxyhydroxide grains containing zinc beforehand in a eutectic form could easily take in zinc ions saturated in the electrolytic solution during its storage, and as a result, could prevent elution of zing into the electrolytic solution during storage of the cathode and hence could prevent self-discharge in the cathode.

It is further presumed that, because the anode and the cathode were prevented from self-discharge, respectively, generation of oxygen gas and hydrogen gas was also prevented from the respective poles, which in turn prevented oxidation and deoxidization of their opposite poles by those gases, and this brought additional good effects for preventing self-discharge.

Although the Examples shown here were basically of the AA size, they are not limited to it but are applicable to various sizes.

Moreover, although the Examples are shown as using complex nickel oxyhydroxide coated by a high-order cobalt compound as the anode active material, the same effects have been confirmed even when using nickel oxyhydroxide, and the anode active material is not limited to that.

INDUSTRIAL APPLICABILITY

As explained above, the enclosed nickel-zinc primary battery has excellent properties regarding capacity holding coefficient during storage, energy density, high-efficiency discharge property, and so on, and has a high capacity, without losing the discharge rate property. Therefore, it is optimum for use as a power source of various kinds of portable electronic devices such as portable radio sets or cassette tape recorders especially in devices required to have a heavy-load property.

The production method of a enclosed nickel-zinc primary battery according to the invention is optimum for mass-producing the high-performance battery according to the invention, inexpensively, easily and stably.

The invention claimed is:

1. An enclosed nickel-zinc primary battery using nickel compound grains as an anode active material, wherein
a ratio of an anode theoretical capacity relative to a cathode theoretical capacity is in the range from 1.0 to 1.6, and a ratio of an alkali electrolytic solution relative to said anode theoretical capacity is in the range from 1.0 to 1.6 ml/Ah.

2. An enclosed nickel-zinc primary battery according to claim 1, wherein an anode mold prepared by compression molding of an anode mixture containing said nickel compound grains as said anode active material, a gel cathode prepared by dispersing alloy powder containing zinc as a major component thereof in an alkali electrolytic solution, and a separator are contained in a metal can, said anode mold including a non-solid portion by a ratio in volume relative to said anode active material in the range from 0.2:1 to 0.5:1, and said non-solid portion having a volume occupying said anode mold by a ratio in the range from 15 to 30 volume %.

3. An enclosed nickel-zinc primary battery according to claim 1, wherein said enclosed nickel-zinc primary battery has an inside-out structure.

4. An enclosed nickel-zinc primary battery according to claim 1, wherein said anode active material is nickel oxyhydroxide grains.

5. An enclosed nickel-zinc primary battery according to claim 4, wherein said nickel oxyhydroxide grains contain γ-nickel oxyhydroxide.

6. An enclosed nickel-zinc primary battery according to claim 4, wherein said anode active material is nickel oxyhydroxide grains, nickel oxyhydroxide grains containing zinc and cobalt alone or both of them in a eutectic form.

7. An enclosed nickel-zinc primary battery according to claim 4, wherein said anode active material further contains a compound of at least one kind of metal selected from the group consisting of yttrium, ytterbium, erbium and calcium.

8. An enclosed nickel-zinc primary battery according to claim 4, wherein said anode active material is nickel oxyhydroxide grains coated by a cobalt high-order oxide, metallic cobalt or metallic nickel, or nickel oxyhydroxide grains containing zinc and cobalt alone or both of them in a eutectic form.

9. An enclosed nickel-zinc primary battery according to claim 8, wherein said cobalt high-order oxide coating said anode active material is at least one material selected from the group consisting of cobalt oxyhydroxide, tri-cobalt tetroxide, bi-cobalt trioxide, cobalt monoxide, and cobalt hydroxide.

10. An enclosed nickel-zinc primary battery according to claim 8, wherein said anode active material is composed of nickel oxyhydroxide grains coated by a cobalt high-order oxide, and said grains exhibit an endothermic peak in the range from 200° C. to 260° C. in differential thermal analysis.

11. An enclosed nickel-zinc primary battery according to claim 10, wherein said nickel compound grains forming said anode active material coated has a specific resistance not higher than 100 Ω·cm.

12. An enclosed nickel-zinc primary battery according to claim 11, wherein said anode active material is nickel oxyhydroxide compound grains composed of ball-shaped grains.

13. An enclosed nickel-zinc primary battery according to claim 1, wherein said anode mixture contains a quantity of carbon grains in the range from 3 mass % to 15 mass % thereof.

14. An enclosed nickel-zinc primary battery according to claim 13, wherein said carbon grains occupy a ratio in the range from 3 mass % to 10 mass % of said anode mixture.

15. An enclosed nickel-zinc primary battery according to claim 13, wherein said carbon grains have a specific surface area in the range from 1.0 m$^2$/g to 300 m$^2$/g.

16. An enclosed nickel-zinc primary battery according to claim 15, wherein said carbon grains are of a mixed system of at least two groups of carbon grains different in specific surface area.

17. An enclosed nickel-zinc primary battery according to claim 16, wherein said carbon grains are of a mixed system of 25 mass % through 75 mass % of carbon grains having a specific surface area in the range from 1.0 m$^2$/g to 30 m$^2$/g and 75 mass % to 25 mass % of carbon grains having a specific surface area in the range from 30 m$^2$/g to 300 m$^2$/g.

18. An enclosed nickel-zinc primary battery according to claim 13, wherein said anode mixture containing said nickel compound grains as said anode active material and carbon grains as major components thereof contains a stearic acid compound.

19. An enclosed nickel-zinc primary battery according to claim 18, wherein said stearic acid compound is mixed in said anode mixture by a ratio in the range from 0.05 mass % to 0.5 mass %.

20. An enclosed nickel-zinc primary battery according to claim 1, wherein said alkali electrolytic solution is composed of at least one selected from the group consisting of potassium hydroxide, sodium hydroxide and lithium hydroxide as a solute thereof, and said solute has an electrical conductivity not lower than 0.2 S/cm.

21. An enclosed nickel-zinc primary battery according to claim 2, wherein an inside-out battery is composed by accommodating in a battery container a hollow, cylindrical anode mold prepared by compression molding of a mixture for said anode mixture containing said nickel compound grains composed of ball-shaped grains as said anode active material, said separator disposed in a hollow portion of said hollow, cylindrical anode mold, and said gel cathode including said alkali electrolytic solution and inserted in said separator.

* * * * *